United States Patent [19]

Shrewsbury et al.

[11] 3,753,397

[45] Aug. 21, 1973

[54] APPARATUS FOR SECTIONIZING CITRUS FRUIT

[75] Inventors: Robert S. Shrewsbury, Dunedin; J. D. Webb, Clearwater, both of Fla.; R. C. Bushman, Claremont, Calif.

[73] Assignee: Brown International Corporation, Covina, Calif.

[22] Filed: Nov. 27, 1970

[21] Appl. No.: 93,022

Related U.S. Application Data

[62] Division of Ser. No. 697,215, Jan. 11, 1968, Pat. No. 3,566,940.

[52] U.S. Cl............................ 99/491, 99/538, 99/515
[51] Int. Cl............................................... A23n 15/00
[58] Field of Search....................... 146/3 N; 99/491, 99/538, 515

[56] References Cited
UNITED STATES PATENTS

| | | | |
|---|---|---|---|
| 3,105,531 | 10/1963 | Belk | 146/3 N |
| 2,247,589 | 7/1941 | Polk, Sr. et al. | 146/3 N |
| 3,081,805 | 3/1963 | Shrewsbury | 146/3 N |

*Primary Examiner*—Willie G. Abercrombie
*Attorney*—Paul A. Weilen

[57] ABSTRACT

It is old to sectionize a single peeled citrus fruit by a procedure wherein the fruit is penetrated by a set of tines of a fruit holder for rotating the fruit step by step in synchronism with associated reciprocating sectionizing tool means. The sectionizing tool means comprises a pair of tools that straddle the radial membranes of the fruit in succession for successive severance of the fruit sections, severance being accomplished largely by concentrated jets of water directed radially from the tools along opposite sides of the membranes. Indexing the rotation of the peeled fruit with respect to the successive radial membranes is accomplished by inserting the tip of one of the pair of tools into the rotating fruit and terminating the rotation in response to impingement of a radial membrane against the tool.

The present invention is an apparatus for processing batches of peeled fruit in this general manner in rapid succession for a high rate of production. While one batch is being sectionized on a plurality of fruit holders, fruit of a new batch are being manually impaled on upright spikes of a corresponding plurality of fruit holders. After a batch sectionizing operation, the downwardly extending sets of tines of the plurality of fruit holders are aligned axially with the corresponding loading spikes and the new batch is transferred to the tines of the fruit holders. The fruit holders are then shifted to positions adjacent corresponding reciprocative sectionizing tools and corresponding cup members are moved into position to support the fruit from below during the batch sectionizing operation.

All of the sectionizing tools are fixedly but adjustably mounted on a vertical reciprocative frame for simultaneous sectionizing strokes and synchronization of the rotation of the fruit with the operation of the sectionizing tools is accomplished by employing cam means on the vertically reciprocative frame to actuate the fruit holders. Indexing of the rotating fruit relative to the successive radial membranes of the fruit is accomplished by providing individual clutches for the fruit holders and disengaging each clutch in response to impingement of a radial membrane of the corresponding rotating fruit against the corresponding partially inserted fruit sectionizing tool.

17 Claims, 53 Drawing Figures

United States Patent
Shrewsbury et al.
[11] 3,753,397
[45] Aug. 21, 1973
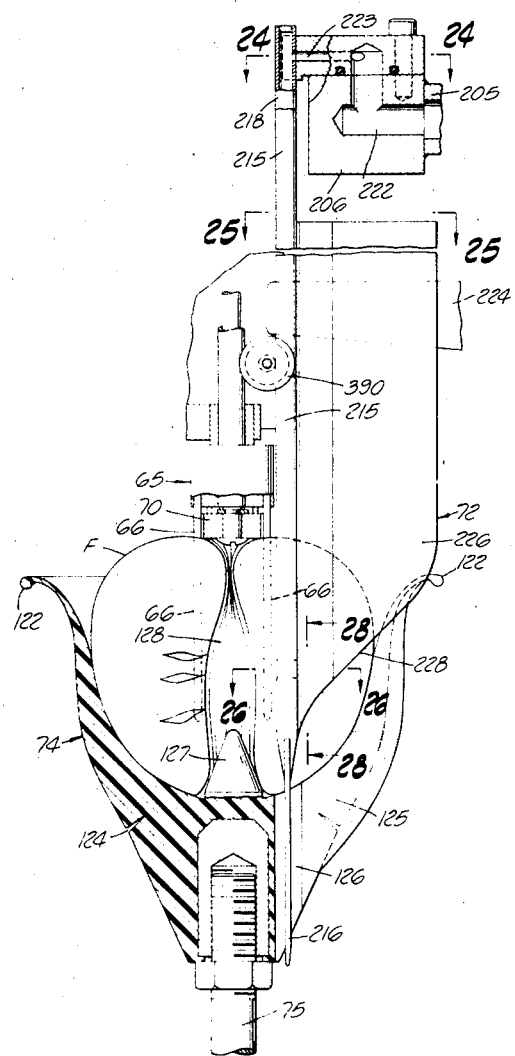

Patented Aug. 21, 1973

INVENTORS.
ROBERT S. SHREWSBURY
JOHN D. WEBB
RONALD C. BUSHMAN

Paul A. Weilein
ATTORNEY

Patented Aug. 21, 1973

INVENTORS.
ROBERT S. SHREWSBURY
JOHN D. WEBB
RONALD C. BUSHMAN
BY Paul A. Weilein
ATTORNEY Patented Aug. 21, 1973
3,753,397
17 Sheets-Sheet 4
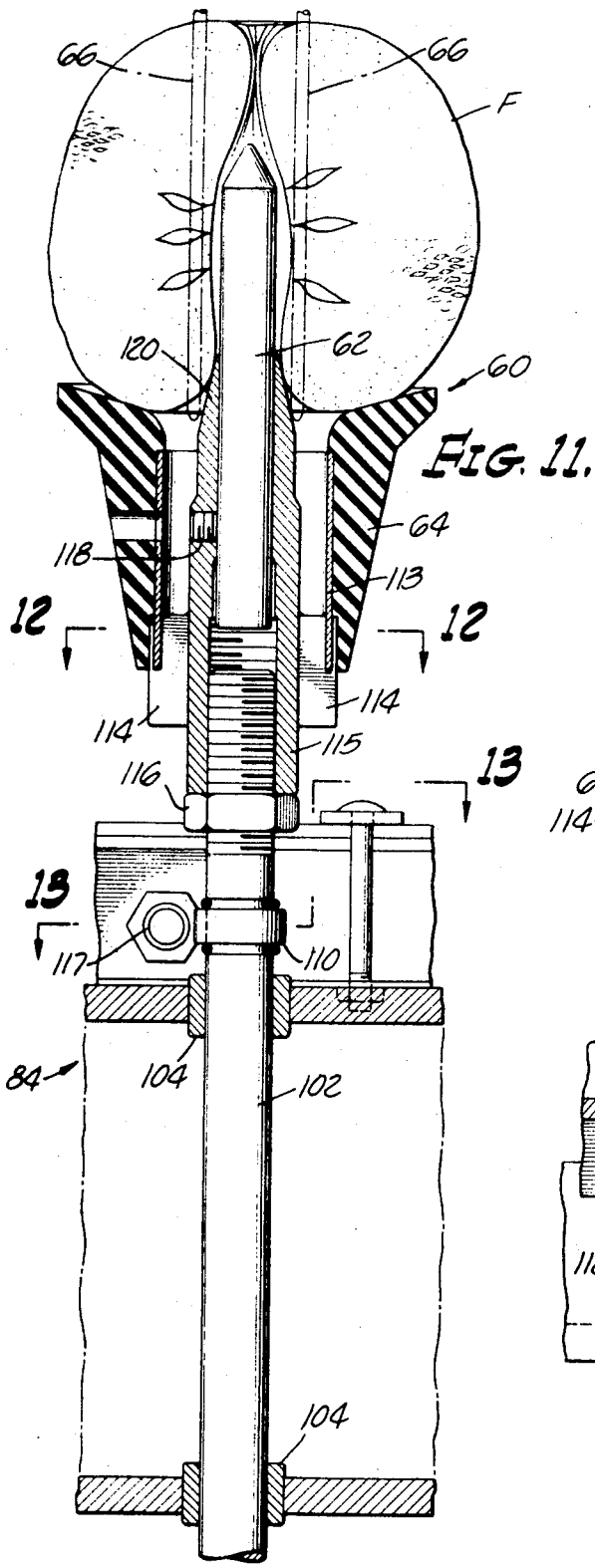
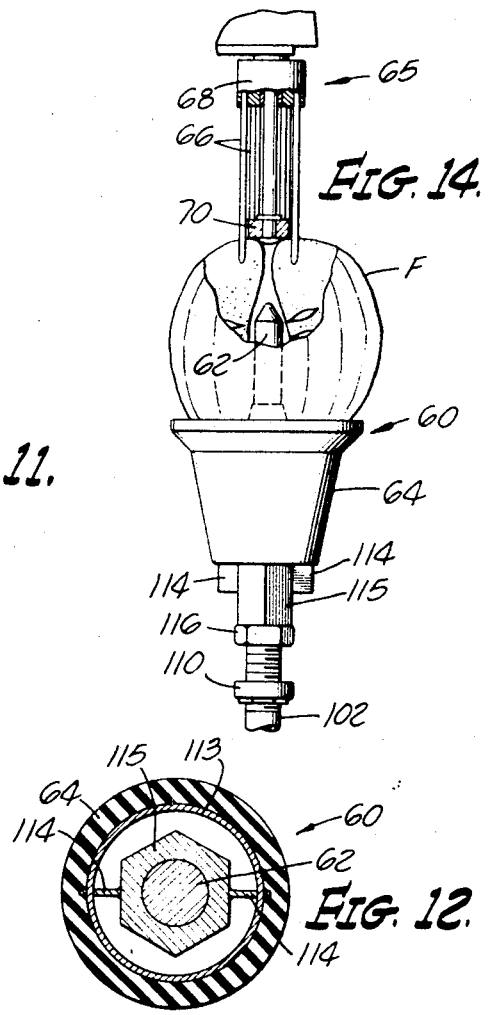
INVENTORS.
ROBERT S. SHREWSBURY
JOHN D. WEBB
RONALD C. BUSHMAN
BY
Paul A. Weilein
ATTORNEY

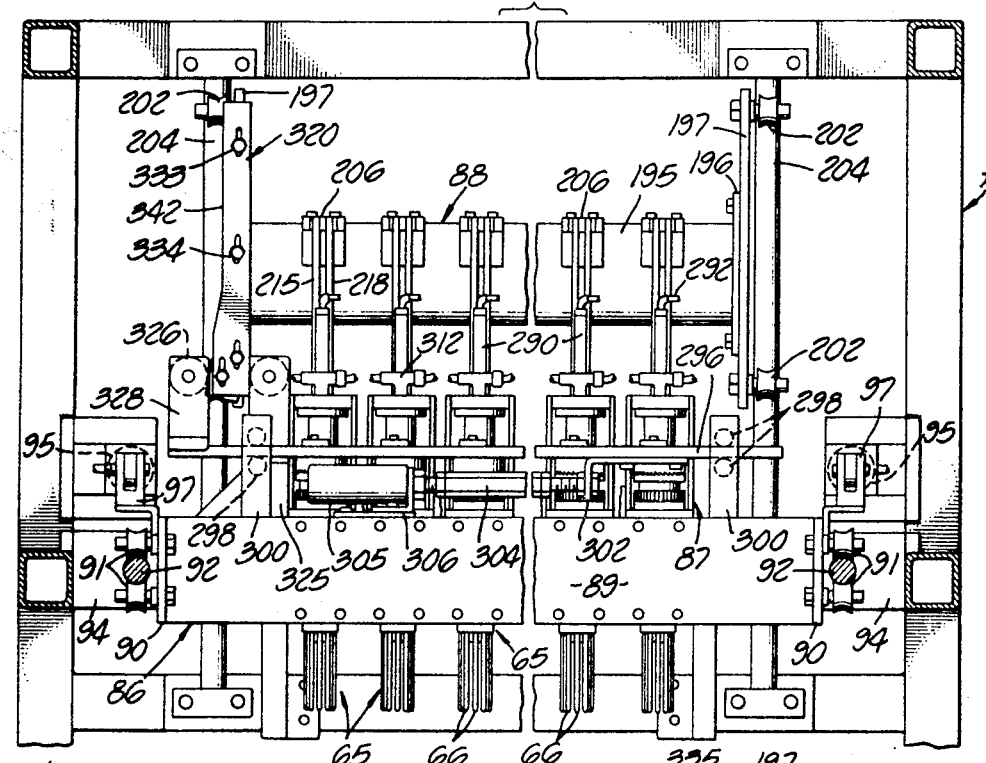
FIG. 15.
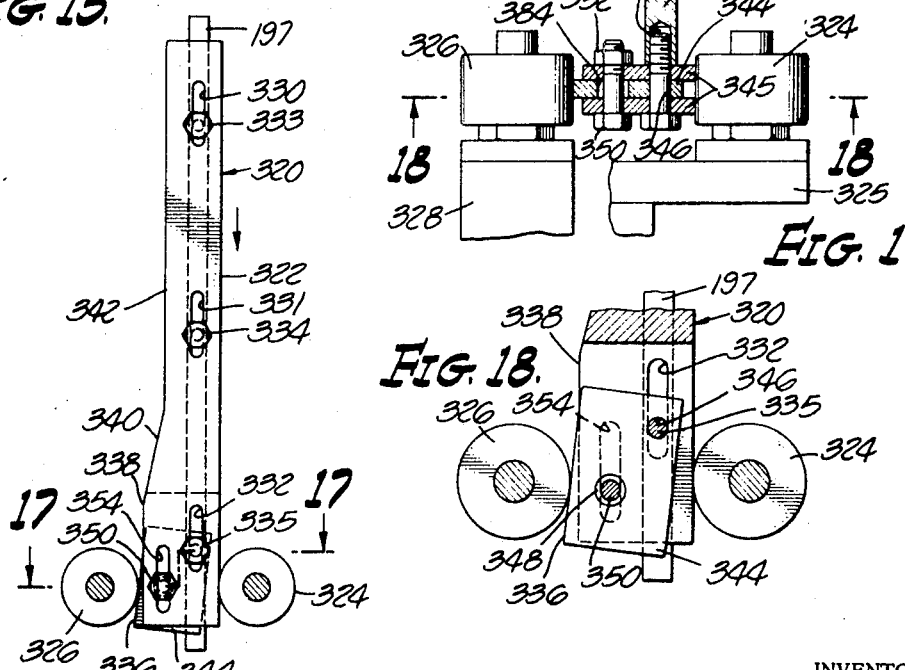
FIG. 16.
FIG. 17.
FIG. 18.
INVENTORS.
ROBERT S. SHREWSBURY
JOHN D. WEBB
RONALD C. BUSHMAN
BY Paul A. Weilein
ATTORNEY

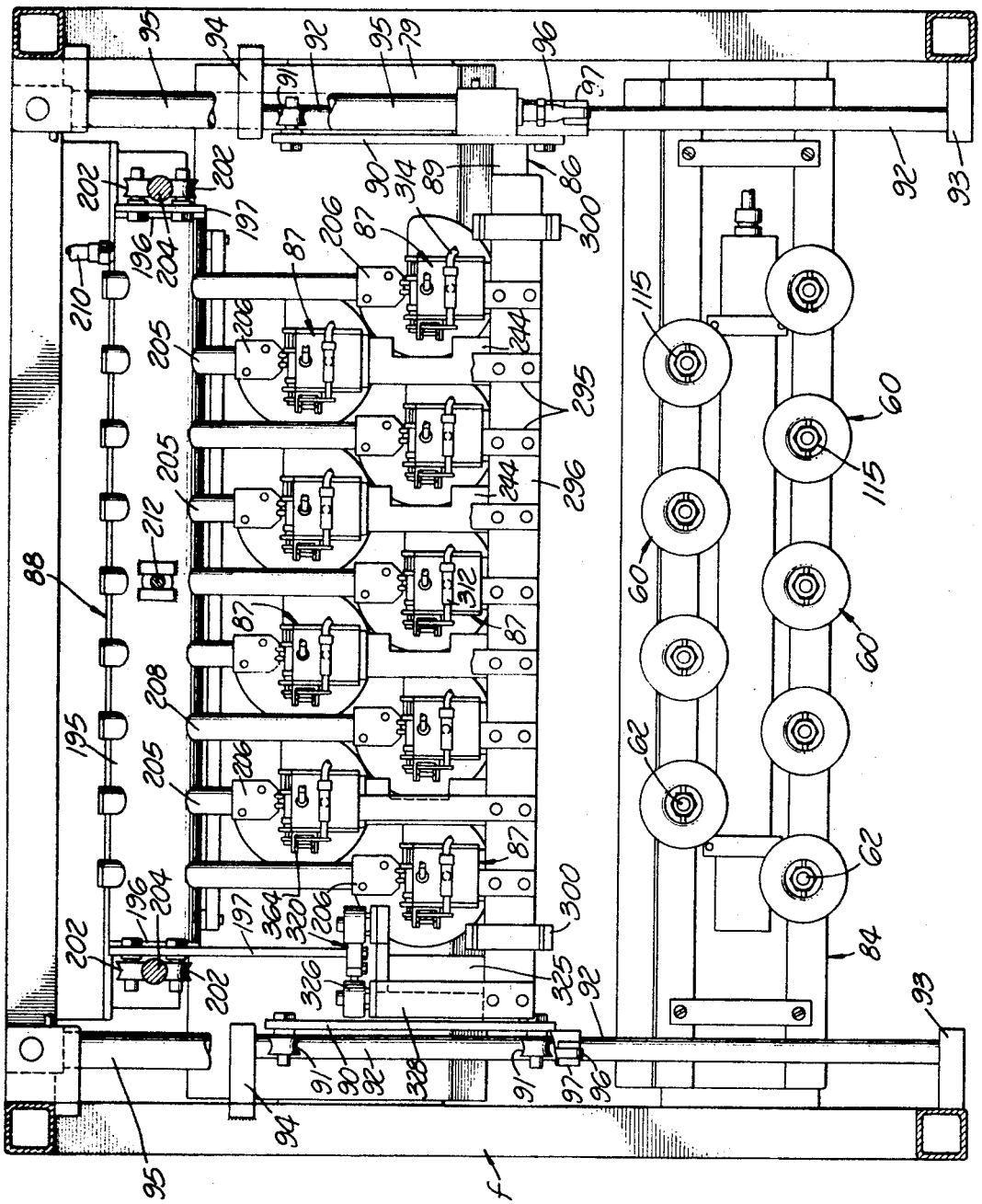

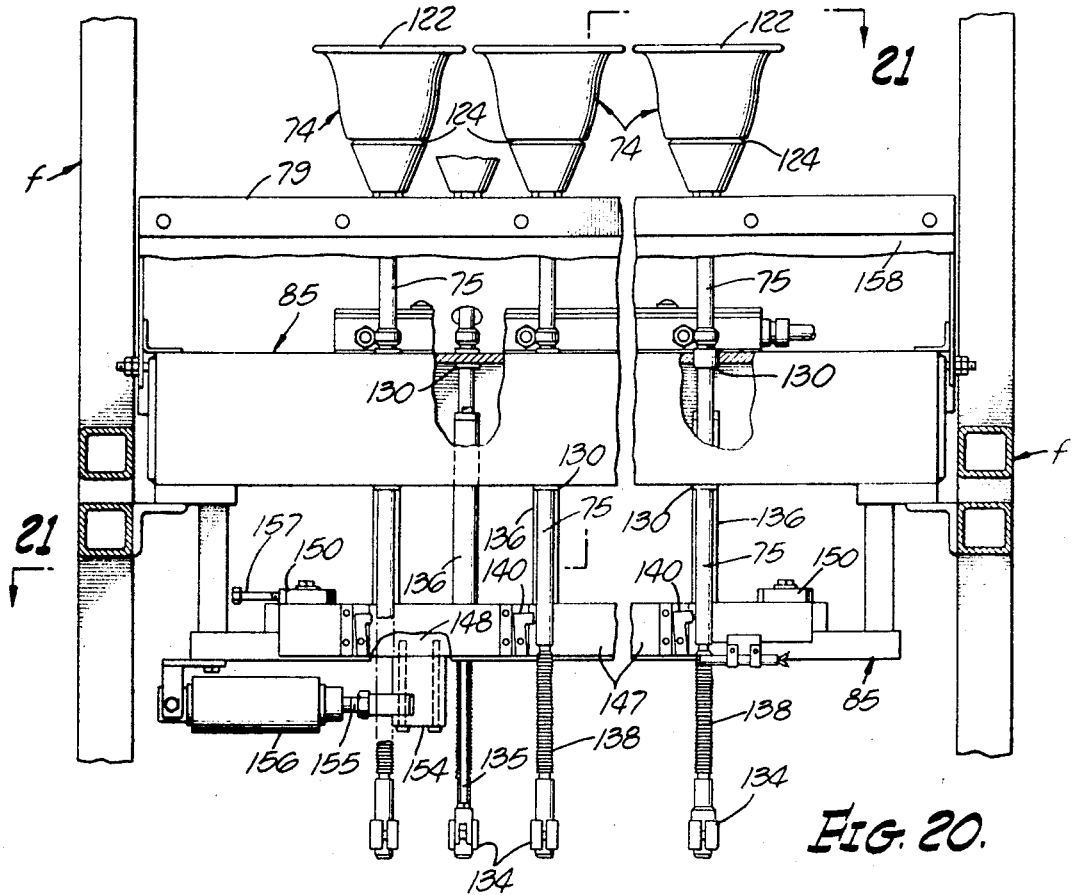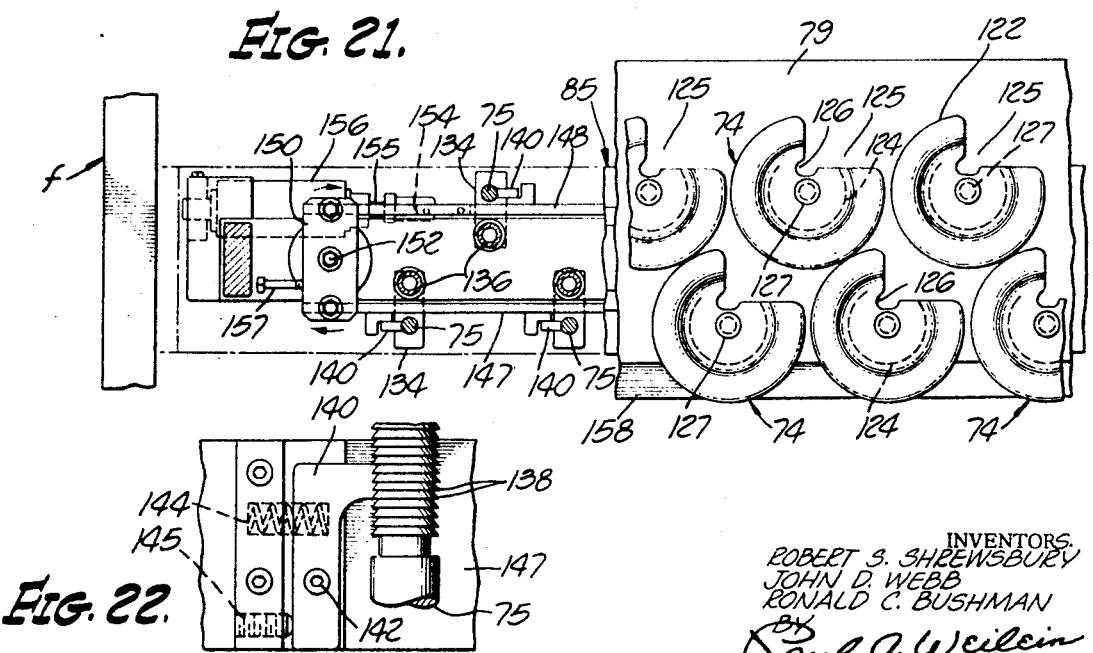

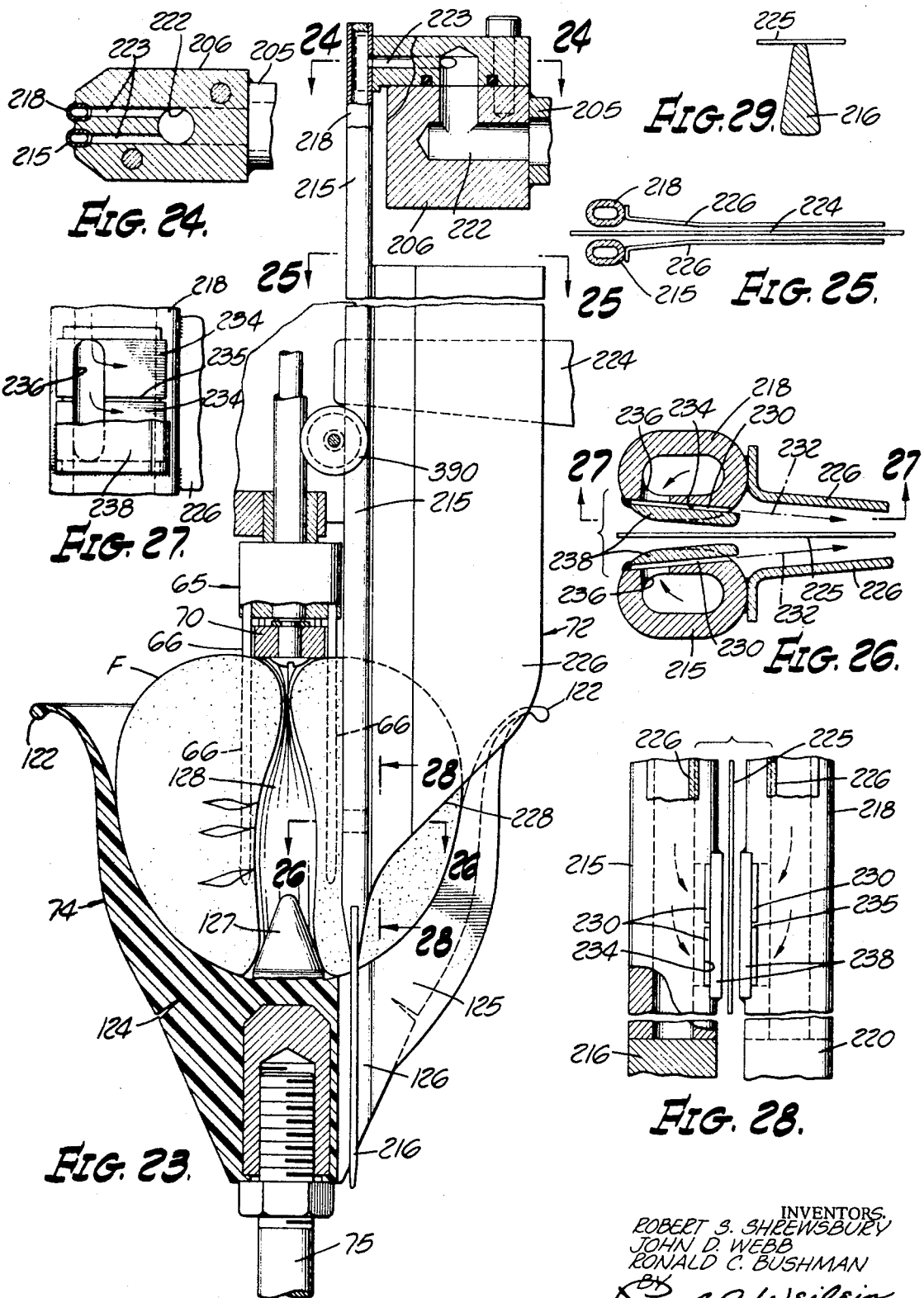

Patented Aug. 21, 1973
3,753,397
17 Sheets-Sheet 9
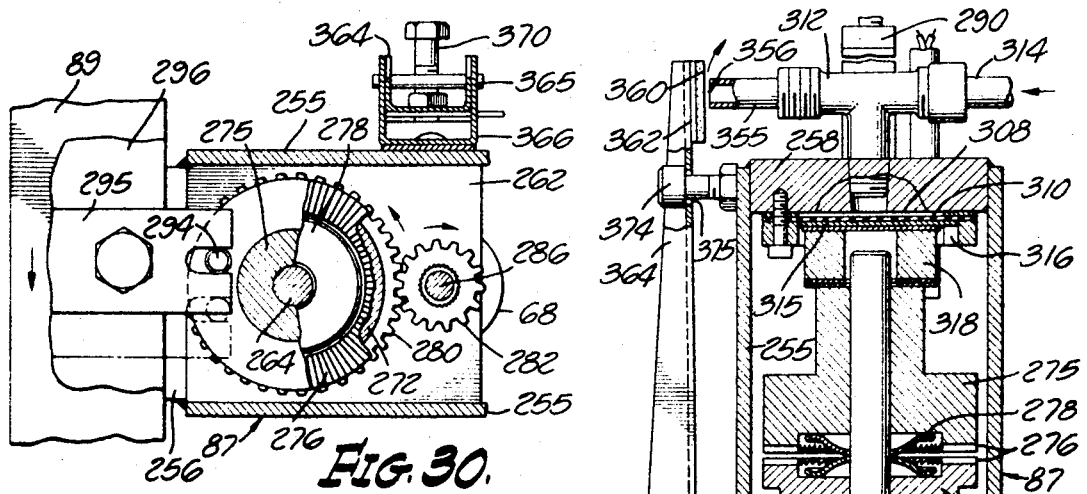
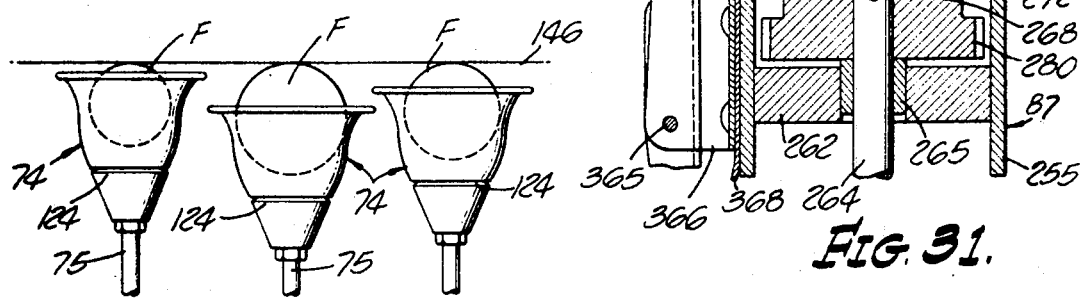
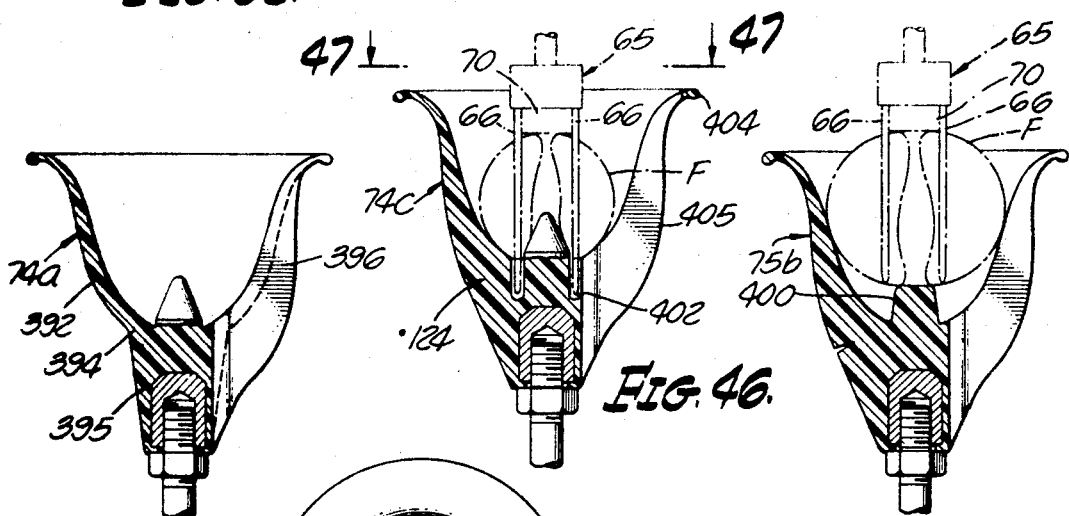
INVENTORS.
ROBERT S. SHREWSBURY
JOHN D. WEBB
RONALD C. BUSHMAN
BY Paul A. Weilein
ATTORNEY Patented Aug. 21, 1973

INVENTORS.
ROBERT S. SHREWSBURY
JOHN D. WEBB
RONALD C. BUSHMAN
BY Paul A. Weilein
ATTORNEY Patented Aug. 21, 1973

INVENTORS.
ROBERT S. SHREWSBURY
JOHN D. WEBB
RONALD C. BUSHMAN
BY Paul A. Weilein
ATTORNEY

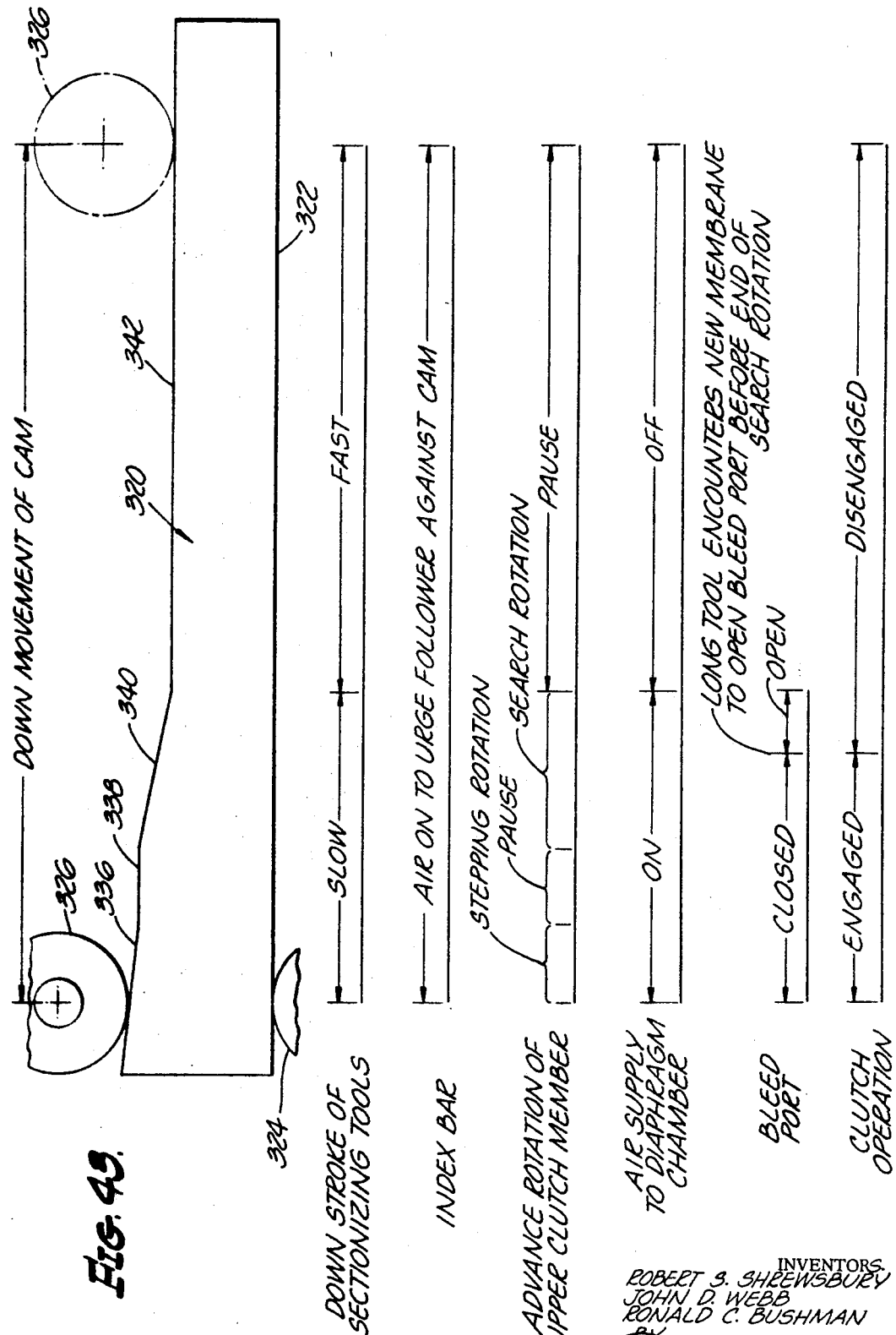

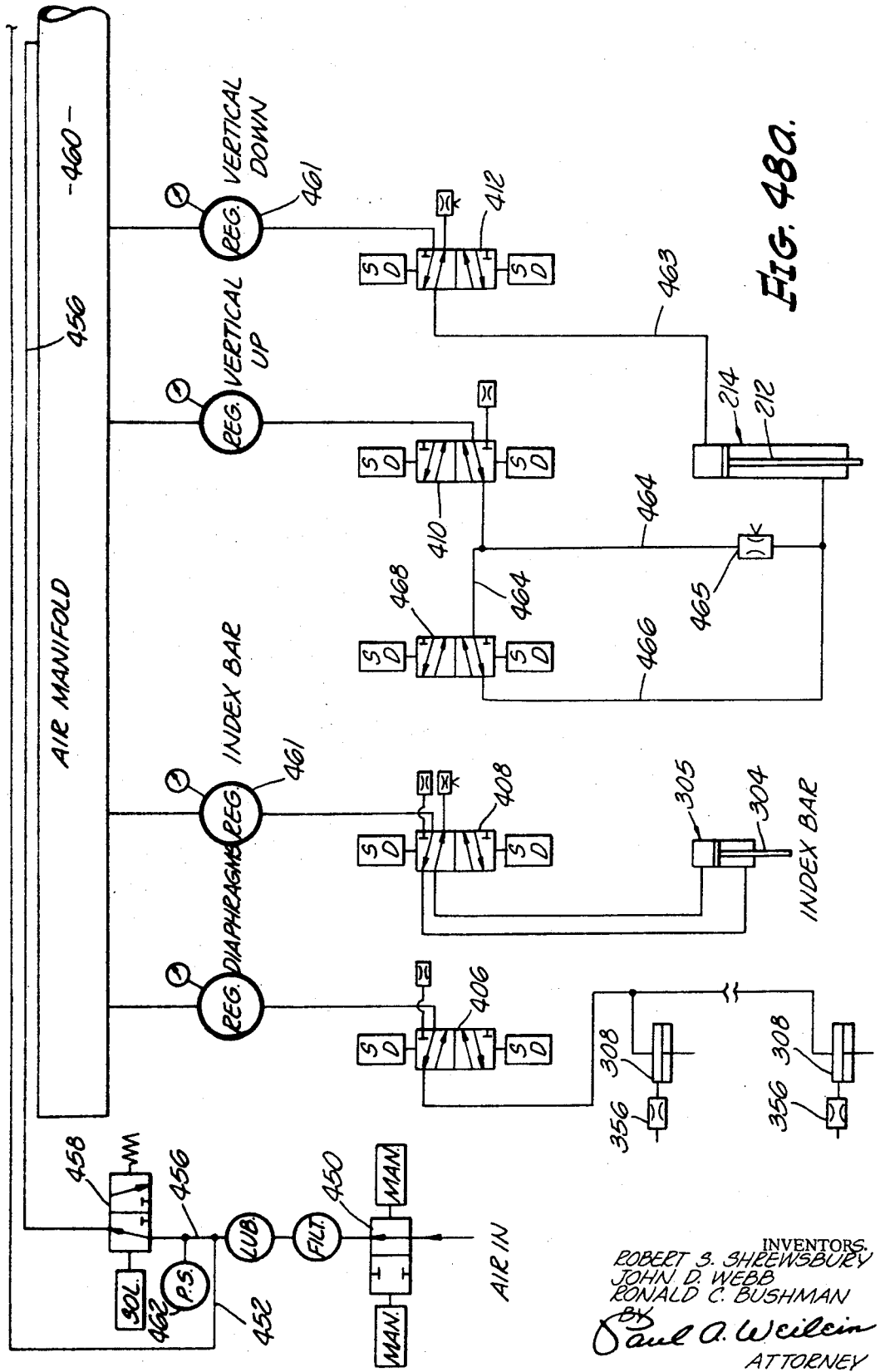

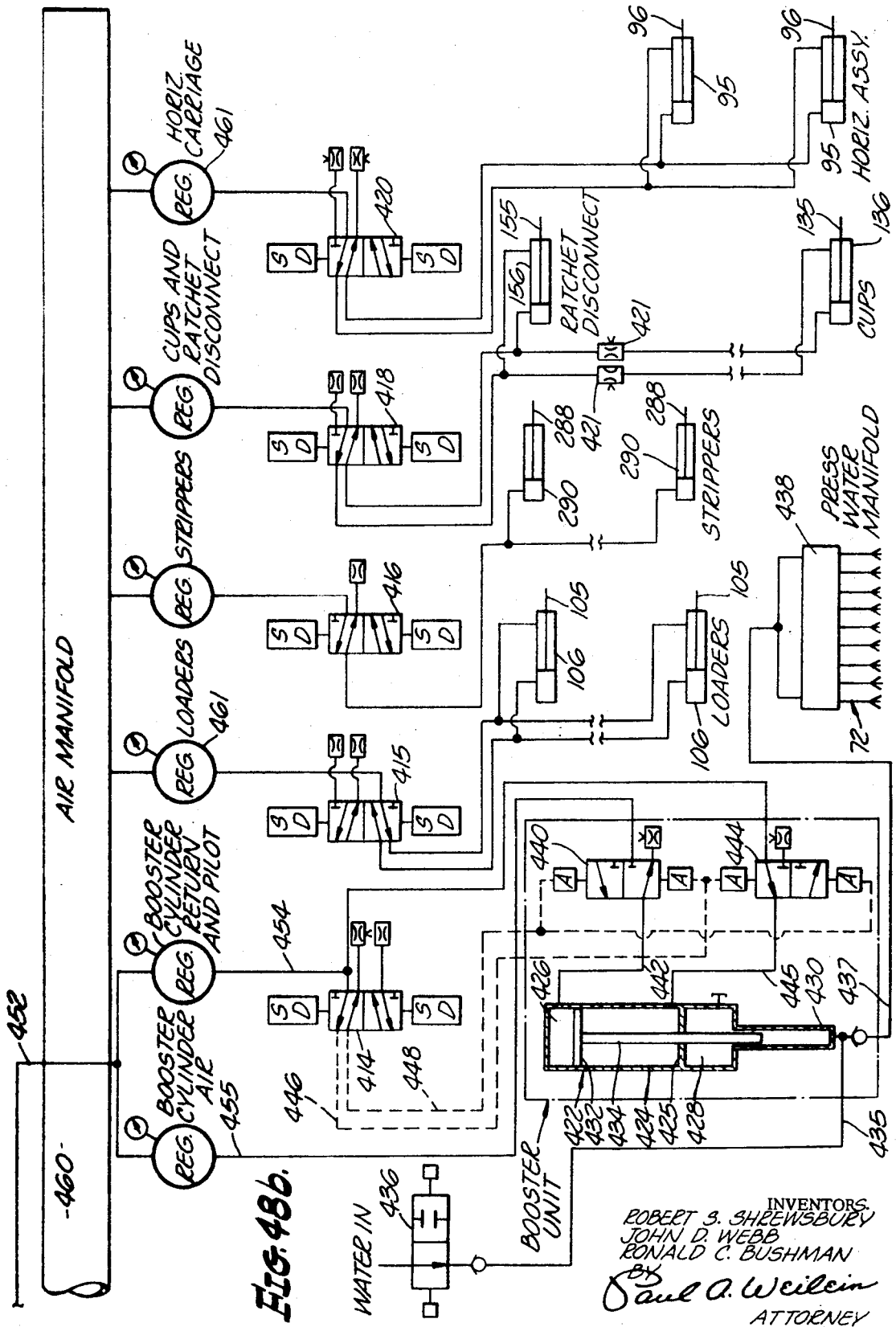

APPARATUS FOR SECTIONIZING CITRUS FRUIT

CROSS REFERENCE TO RELATED APPLICATION

This application is a Division of my copending application, Ser. No. 697,215, filed Jan. 11, 1968, now U.S. Pat. No. 3,566,940.

BACKGROUND OF THE INVENTION

The three Shrewsbury U.S. Pat. Nos. 3,022,016, No. 3,030,995, and No. 3,081,805, which are hereby incorporated into the present disclosure by reference, teach how a single peeled citrus fruit may be sectionized by rotating the fruit by stages and straddling the radial membranes of the fruit in succession by a pair of reciprocative tools that employ radial outwardly directed jets of water to separate the fruit membranes from the fruit sections. The peeled citrus fruit is rotated by means of tines that extend into the fruit and the rotation of the fruit is indexed with respect to the radial membranes of the fruit by partially inserting one of the tools into the rotating fruit and then stopping the rotation in response to impingement of a radial membrane of the fruit against the partially inserted tool. The pair of tools is then reciprocated along the opposite sides of the fruit membrane to separate the membrane from the adjacent fruit sections and then the fruit is automatically rotated another step in preparation for severance of the next fruit section.

In the prior Shrewsbury apparatus, a single shaft carries rotary cams to cause intermittent rotation of the fruit and to cause synchronized reciprocation of the pair of sectionizing tools. Indexing the rotation of the fruit with respect to the radial membranes of the fruit is accomplished by employing a friction clutch to rotate the fruit with the clutch weak enough to slip when a radial membrane is encountered. Since the friction clutch continues to fight to rotate the fruit after a membrane is encountered, one need for improvement is to eliminate this inefficient aspect of the apparatus.

Since the fruit of different runs varies in texture from relative firmness to spongy softness, the torque delivered by the friction clutch must be variable over a relatively wide range. A high torque that is necessary for the sectionizing tool to search for a radial membrane of a firm fruit would simply cause the tool to break through a radial membrane of a weaker fruit without detecting the membrane. Unfortunately, it is difficult to adjust the output torque of a friction clutch to meet the particular requirements of different runs of fruit. Such a clutch cannot be relied upon to maintain a given precise adjustment for a long run. A further need, therefore, is for a more sensitive and precisely adjustable means for sensing a radial membrane of a rotating fruit.

For maximum efficiency of the sectionizing operation it is requisite that the natural axis of the fruit coincide with the axis of rotation of the fruit-holding tines. The difficulty is that a citrus fruit is commonly of nonsymmetrical configuration with the radial dimension of the fruit from its natural axis varying around the circumference of the fruit. The need in this regard is for some expedient for axially centering a non-circular fruit on a rotary set of tines.

In the above-mentioned prior art, the fruit is largely free around its circumference during the sectionizing operation and when an unconfined fruit is partially sectionized it tends to sag and fall apart with consequent sectionizing inefficiency and loss of production. For this reason a suitable expedient should be provided to keep the rotating fruit effectively captivated during the whole sectionizing operation and, in addition, some provision should be made to strip the fruit residual or "rag" from the set of tines after the sectionizing operation.

A number of problems must be met in any attempt to construct an apparatus of this general character that is suitable for mass production on a commercial scale. In some prior art practices these problems have been approached by employing some type of arrangement for moving the fruit in succession through a prolonged processing zone, a number of different fruit being at various stages in the process at any given moment. Such an apparatus is necessarily far from compact and, in addition, is inherently complicated. Moreover, if any single mechanism in the chain of mechanisms becomes defective, production stops. The need is for more compact and simpler apparatus for mass production. The object of the present invention is to solve the various problems involved and to meet the above-mentioned needs for improvement.

SUMMARY OF THE INVENTION

A plurality of fruit holders having sets of downwardly extending tines is mounted on a carriage that is movable horizontally between a forward loading position and a rearward operating position, the operating position being adjacent a vertically reciprocative frame carrying a corresponding plurality of fruit sectionizing tools. A corresponding plurality of upwardly extending loading spikes spaced below the forward loading position of the carriage is movable upwardly to transfer new fruit thereon to the tines of the fruit holders while the carriage is in its forward position. In addition, a corresponding plurality of cup members located below the rearward operating position of the carriage is movable upwardly to embrace and support the fruit during the mass sectionizing operation. The several fruit on the holders are automatically sectionized simultaneously in a short time period during which the operator places a new batch of fruit on the loading spikes. High production is possible because there are a sufficient number of the loading spikes for full utilization of the operator's time during the sectionizing operation.

The loading spikes solve the problem of accurately positioning the fruit coaxially on the sets of tines of the rotary holders because the spikes are tapered and dimensioned to take advantage of the natural axial cavities of the fruit, the tapered leading ends cooperating with the natural axial cavities to guide the fruit into coaxial positions on the spikes. Subsequently, the loading spikes are placed in axial alignment with the corresponding fruit holders and are then moved axially to transfer the fruit to accurate coaxial positions on the fruit holder tines.

During each step in the sectionizing operation, all of the fruit holders are rotated simultaneously by means of individual clutches and each clutch is disengaged independently to terminate the rotation of the corresponding fruit in response to impingement of a radial membrane of the rotating fruit against the corresponding sectionizing tool. For this purpose the individual clutches are controlled by diaphragms in corresponding air chambers and suitably dimensioned vent ports of the air chambers are controlled in response to impingement of radial fruit membranes against the sectionizing tools. Simple valve members for controlling the vent ports are mounted on spring biased levers which respond to lateral pressure against the sectionizing tools and it is a simple matter to adjust the levers and biasing springs for any degree of sensitivity that may be required for a particularrun of fruit.

A further feature of the invention is the provision of the above-mentioned cups to surround and support the fruit during the sectionizing operation. Preferably, the cups are made of relatively yieldable elastomeric material by virtue of which the cups may accommodate fruit of various diameters with adequate support in each instance. The problem of synchronization of the rotation of the plurality of holders with the lurality of sectionizing tools is met by mounting all of the tools on a vertically reciprocative frame and by mounting a longitudinal actuating cam on the frame to rotate the holders simultaneously, with the rotation of each holder subject to interruption by impingement of a radial fruit membrane against the corresponding sectionizing tool.

The apparatus is made safe and foolproof by requiring the operator to use both hands to start an operative cycle when a new batch of fruit is impaled on the loading spikes. The problems involved in carrying out a completely automatic operating cycle are solved in various ways by combining a pneumatic actuating system with an electrical control system.

The various features and advantages of the invention may be understood by reference to the following detailed description and the accompanying drawings.

BRIEF DESCRIPTION OF THE DRAWINGS

In the drawings, which are to be regarded as merely illustrative:

FIG. 11 is an enlarged section of a fruit loader taken as indicated by the line 11—11 of FIG.7;

FIG. 12 is a transverse section of a fruit loader taken as indicated by the line 12—12 of FIG. 11;

FIG. 13 is a sectional view along the angular line 13—13 of FIG. 11 showing how a magnet mounted on a fruit loader cooperates with a corresponding stationary reed switch in the automatic cycle of the apparatus;

FIG. 14 is a fragmentary elevational view, partly in section, showing a loader in the course of its upward movement for transferring a fruit to the tines of a corresponding fruit holder;

FIG. 15 is a sectional view along the line 15—15 of FIG. 7 showing the horizontally movable carriage in front elevation with the vertically reciprocative frame for the sectionizing tools back of the carriage;

FIG. 16 is an enlarged elevational view of a longitudinal cam on the vertically reciprocative frame that carries the plurality of sectionizing tools, the cam being effective to actuate the rotary fruit holders during the sectionizing operations;

FIG. 17 is an enlarged transverse sectional view of the cam taken along the angular line 17—17 of FIG. 16;

FIG. 18 is a sectional view of the cam taken along the line 18—18 of FIG. 17;

FIG. 19 is a horizontal sectional view taken along the line 19—19 of FIG. 7 to show in plan the plurality of loaders, the horizontal carriage and the vertically reciprocative tool-carrying frame;

FIG. 20 is a section lying along the angular line 20—20 of FIG. 7 showing the cups and associated mechanisms in side elevation;

FIG. 21 is a sectional view along the angular line 21—21 of FIG. 20;

FIG. 22 is an enlarged detail of FIG. 20 showing a pawl and ratchet mechanism that is associated with each of the cups;

FIG. 23 is an enlarged view partly in section and partly in elevation showing a fruit holder, a cooperating cup, and the corresponding sectionizing tool, the parts being in the positions indicated diagrammatically in FIG. 6;

FIGS. 24 and 25 are transverse sections taken as indicated by the lines 24—24 and 25—25 of FIG. 23;

FIG. 26 is an enlarged fragmentary section of a pair of sectionizing tools taken as indicated by the line 26—26 of FIG. 23;

FIG. 27 is an elevation of a portion of a sectionizing tool as seen along the line 27—27 of FIG. 26;

FIG. 28 is an enlarged elevation of a portion of a sectionizing tool as seen along the line 28—28 of FIG. 23 with part of the tool broken away;

FIG. 29 is a transverse section taken as indicated by the line 29—29 of FIG. 10 showing how a radial membrane of a fruit impinges on a probing sectionizing tool;

FIG. 30 is a sectional view taken along the angular line 30—30 of FIG. 9 showing how a clutch is operatively connected to a corresponding rotary fruit holder;

FIG. 31 is a fragmentary vertical section taken along the line 31—31 of FIG. 9 to show a disengaged clutch;

FIG. 32 is a diagrammatic view showing how the cups lift fruit of various diameters to a predetermined level;

FIG. 43 is a diagrammatic view relating different operations of components of the apparatus to the longitudinal cam on the vertical frame that carries the sectionizer tools;

FIGS. 44–46 are sectional views of cups of different configurations that may be employed in the apparatus;

FIG. 47 is a plan view of the cup in FIG. 46 as seen along the line 47—47;

FIGS. 48a and 48b taken together represent diagrammatically the pneumatic actuating system that is incorporated in the apparatus;

DESCRIPTION OF THE PREFERRED EMBODIMENT

General Arrangement (FIGS. 1-7 and 19)

Figure 1:
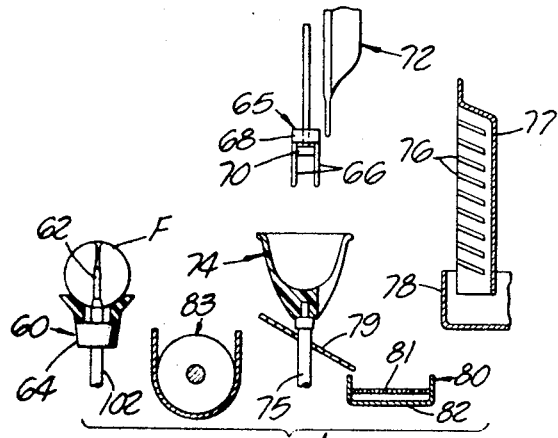
FIGS. 1–6 are diagrammatic views representing successive stages in the operating cycle of the apparatus.

The presently preferred embodiment of the invention sectionizes the fruit in batches of nine and, therefore, has nine suitable sets of cooperative components which may be of various constructions in various practices of the invention and which are actuated in suitable sequence in an operating cycle. FIGS. 1-6 are diagrammatic views showing the successive stages in the cycle of operation of one of the nine sets of components, FIGS. 1-5 showing the stages that lead up to the final stage in FIG. 6 where the actual sectionizing operation is performed.

The particular components shown in FIGS. 1-6 comprise: a loader 60 having an upright spike 62 to impale a fruit F axially and having an associated structure 64 to support the fruit; an elevated fruit holder, generally designated 65, having a set of tines 66 extending downwardly from a holder head 68 and further having a stripper 70 inside the set of tines for stripping the residue of the fruit from the tines after a sectionizing operation; a vertically reciprocative sectionizing tool means 72 which provides radial jets of water to facilitate the sectionizing operation; a flexible elastomeric cup 74 mounted on a stem 75 to enclose and support the fruit during the sectionizing operation, the cup being cut away to clear the sectionizing tool means 72; a set of louvers 76 and a baffle 77 to divert the water jets into a drainage trough 78; an inclined baffle 79 and a discharge chute 80 to receive the successive fruit sections, the discharge chute having a web 81 to receive the fruit sections, the web being perforated to permit the seeds to fall onto a bottom wall 82; and a screw conveyor 83 to carry away the residual of the sectionized fruit.

Figure 5:
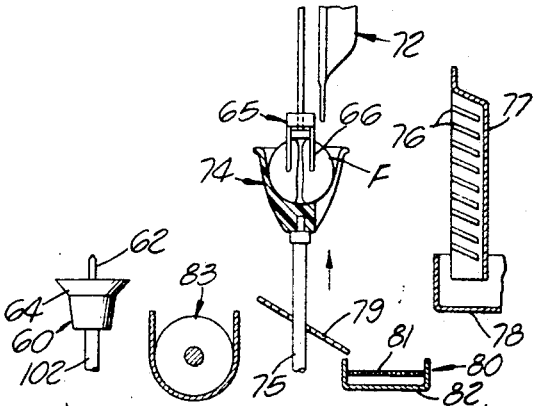

In the first stage of the operating cycle, a preceding fruit has been through the sectionizing operation represented in FIG. 5 wherein the successive fruit sections S are discharged into the chute 80 and the residual of the preceding fruit (not shown) remains on the fruit holder 65. While the sectionizing operation shown in FIG. 5 is in process, the operator has impaled fruit F on the spike 62 of the loader 60 in preparation for the next cycle of operation.

The first step of the operating cycle which is initiated immediately after a sectionizing operation comprises downward retraction of the cup 74 to its lower position shown in FIG. 1. Then the fruit holder 65 moves from its normal rearward operating position shown in FIG. 1 to its forward loading position shown in solid lines in FIG. 2 and as the fruit holder passes through an intermediate position shown in dotted lines in FIG. 2, the stripper 70 is operated to discharge the fruit residue into the screw conveyor 83.

Figure 4:
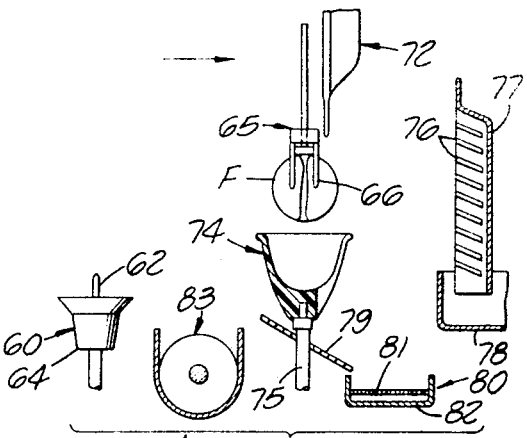
Figure 2:
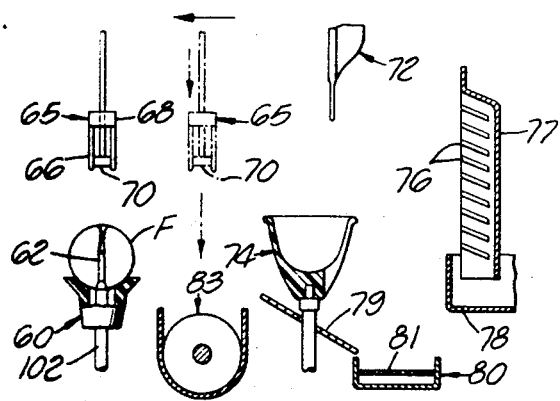
Figure 3:
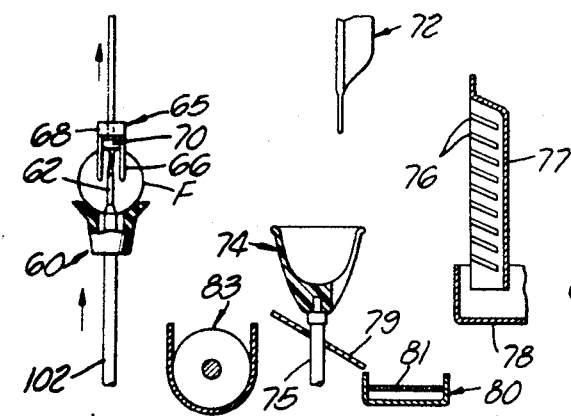
Figure 6:
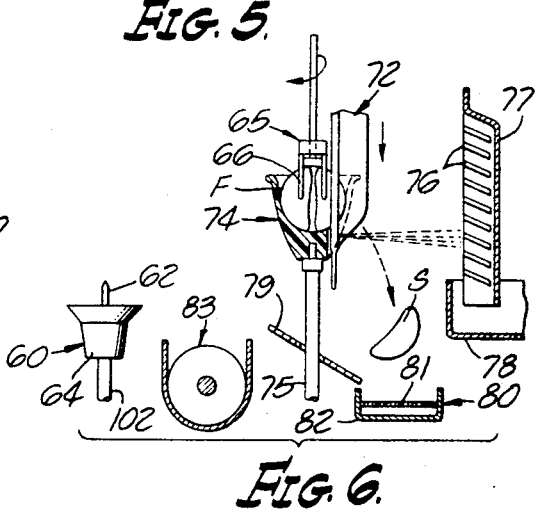

With the fruit holder 65 now in its forward loading position as shown in FIG. 2, the loader 60 rises to transfer the new fruit to the tines of the holder as indicated in FIG. 3. After the fruit is transferred to the holder 65, the loader 60 drops back to its normal position as shown in FIG. 4 and, as also shown in FIG. 4, the elevated fruit holder 65 with the new fruit thereon moves to its rearward operating position.

The next step shown in FIG. 5 comprises upward movement of the cup 74 to a position surrounding and supporting the new fruit on the holder 65. Finally, in FIG. 6 the fruit holder 65 rotates in a step-by-step manner and the sectionizing tool means 72 reciprocates 12 to 16 times in synchronism with the step-by-step rotation to carry out the sectionizing operation.

Figure 7:
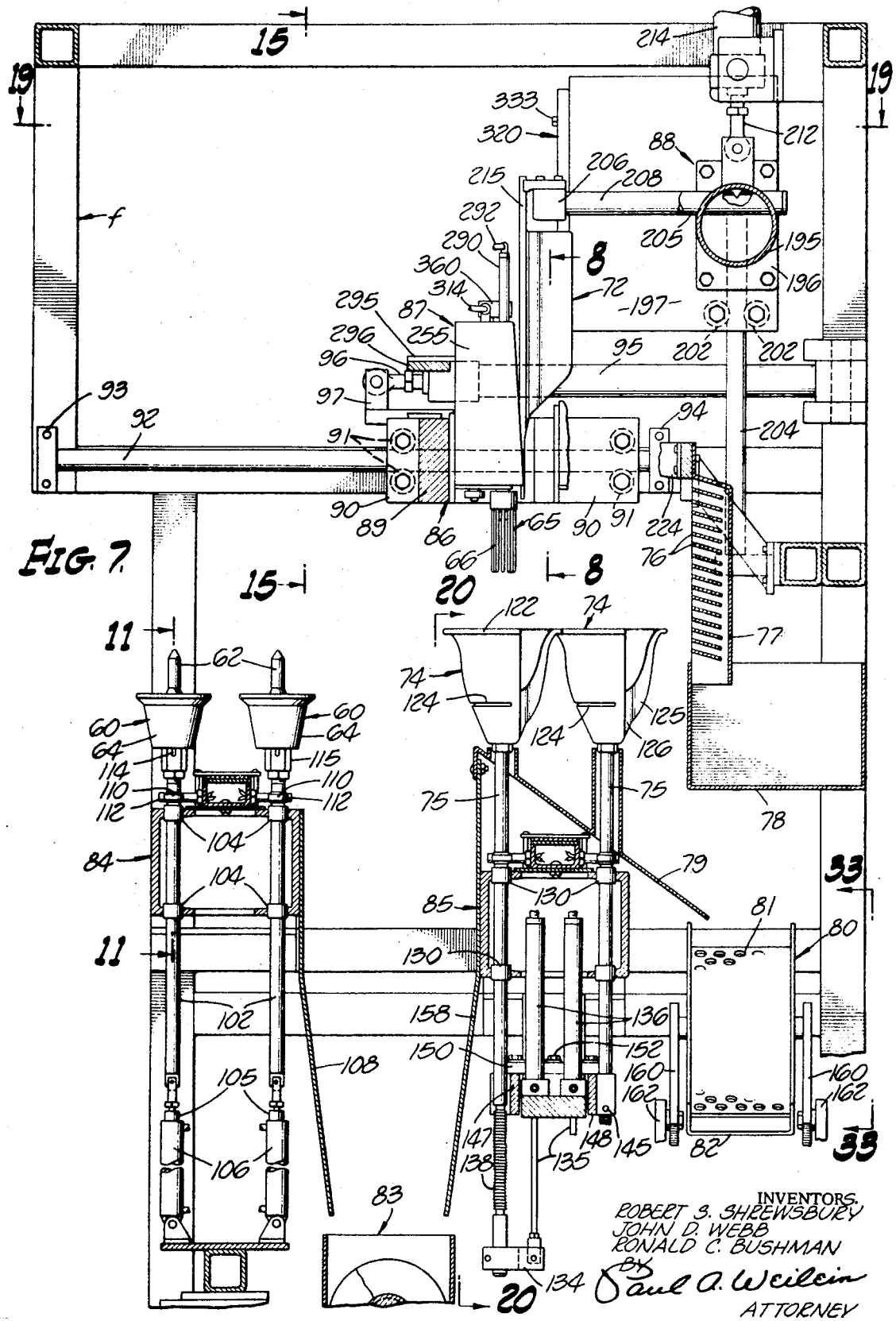
FIG. 7 is a fragmentary view of the whole apparatus partly in vertical section and partly in side elevation.

FIG. 7 shows the principal parts of the present embodiment of the apparatus for sectionizing a batch of nine fruit simultaneously and FIG. 19 is a plan view of the principal parts. The structure shown in FIG. 7 includes: a lower fixed support structure generally designated 84 on which the nine loaders 60 are movably mounted; a lower fixed support structure 85 on which the nine cups 74 are movably mounted; a horizontally movable carriage 86 having nine clutch housings 87 from which the nine fruit holders 65 depend; and a vertical reciprocative frame, generally designated 88, that carries the nine sectionizing tool means 72.

To carry out the operating cycle that is diagrammatically shown in FIGS. 1-6, the carriage 86 moves horizontally between its rearward operating position shown in FIG. 7 and an alternate forward loading position; the nine loaders 60 move upwardly from their lower retracted position shown in FIG. 7 to load the fruit on the holders 65 when the carriage 85 is at its forward loading position; the nine cups 74 move upwardly from their retracted positions shown in FIG. 7 to cooperate with the respective holders 65 when the carriage 86 is in its rearward operating position; and the vertically reciprocative frame 88 that carries the nine sectionizing tool means 72 reciprocates to carry out the nine sectionizing operations simultaneously while the carriage 86 is at its rearward operating position. As will be explained, the reciprocating vertical frame 88 is operatively associated with mechanisms in the nine clutch housings 87 to cause the required intermittent rotation of the holders 65 with the rotation of the individual holders indexed with respect to the radial membranes of the individual fruit.

The eight clutch housings 87 are arranged in two rows on the previously mentioned horizontal carriage 86, as may be seen in FIG. 19. The horizontal carriage 86 comprises essentially a transverse beam 89 with two end plates 90 fixedly mounted on the opposite ends of the beam. The end plates 90 carry pairs of rollers 91 for cooperation with two fixed horizontal guide rods 92 on opposite sides of the apparatus. The forward end of each guide rod 92 is attached to the apparatus frame f by means of a corresponding bracket 93 and the rear end of each guide rod is connected to the frame by a similar bracket 94.

For moving the carriage 86 between its rearward operating position and its forward loading position, two air cylinders 95 are respectively mounted on opposite sides of the apparatus frame. The two air cylinders 95 have forwardly extending piston rods 96 that are connected to the carriage by corresponding suitable brackets 97.

Structural Details of the Loaders (FIGS. 7, 11-14, and 19)

Each of the nine loaders 60 is mounted on a corresponding vertical stem 102 that is in turn slidingly mounted on collars 104 of the fixed structure 84. Each of the vertical stems 102 is connected at its lower end to a piston rod 105 of a corresponding air cylinder 106 and each air cylinder is connected to a compressed air source to lift the corresponding loader 60 in a yielding manner. One side of the fixed structure 84 carries a baffle 108 to guide the fruit residue into the screw conveyor 83. As shown in FIGS. 7, 11, and 13, each of the nine vertical stems 102 carries a ring-shaped permanent magnet 110 for cooperation with a corresponding stationary reed switch 112.

As shown in FIGS. 11 and 12, the yielding support structure 64 associated with each of the loader spikes 62 is an annular elastomeric member that is mounted on a metal sleeve 113, the metal sleeve being supported by a pair of vertical webs 114 that extend diametrically from a tubular member 115, which tubular member is screw threadedly adjustable on the upper end of the corresponding vertical stem 102. Vertical adjustments of each tubular member 115 are releasably retained by a suitable lock nut 116. The corresponding loader spike 62 is adjustably telescoped into the member 115 and is adjustably retained therein by a set screw 118.

It is to be noted in FIG. 11 that the conical tapered upper end 120 of the tubular member 115 in effect forms a tapered enlargement at the base of the loader spike 62. The purpose of the tapered enlargment 120 is to expand the impaled fruit radially to increase the portion of the fruit that lies outside of the tines 66 of the corresponding holder 65, thereby to increase the portion of the fruit that is subjected to the sectionizing operation.

FIG. 14 shows the stage in the upward movement of a loader 60 at which the new fruit is initially penetrated by the tines 66 of the corresponding holder 65. It may be noted in FIG. 14 that the corresponding stripper 70 is initially at a low position inside the tines 66, the stripper being pushed upwardly to a limit position inside the tines in response to the upward pressure of the fruit that is created by the loader 60.

FIGS. 23 and 24 show that the probe 216 of the longer sectionizing tool 215 is blade-shaped being of elongated cross section that is substantially narrower than the cylindrical body of the sectionizing tool with the dimension of the major axis of the cross section substantially equal to the diameter of the cylindrical body of the sectionizing tool. FIG. 29 shows that the probe 216 is wedge-shaped, or more specifically is of the shape in cross section of a truncated triangle with the tool tapering towards its leading edge.

The wedging action of the probe displaces the pulp in opposite lateral directions from the probe and with the narrow rounded leading edge of the probe is capable of exploring the pulp of the fruit with minimum tendency to rupture the juice cells of the pulp.

It is to be borne in mind that successful detection of a radial fruit membrane requires a substantial differential between the resistance of the fruit pulp to the relative movement of the probe and the higher resistance to penetration of a radial fruit membrane by the probe. If the probe 216 were a thin sharp knife blade it would tend to cut through the pulp and the differential between the resistance of the pulp and the resistance of the radial membrane would be too small for reliable detection of the membrane. At the other extreme, if the probe 216 were of circular cross section with the diameter of the circular cross section equal to the longitudinal axis of the cross section of the present wedge-shaped probe, the resistance to relative movement of the probe would be too great to make the differential too small and the juice cells would be crushed because the path through the pulp of the circular probe would be too wide.

The tubular body of the sectionizing tool must be of substantial outside diameter because it serves as a duct for the pressurized water that is used for jet action to separate th membrane from the pulp. If the tubular body of the sectionizing tool 215 were merely extended downward in length to serve as a probe in substitution for the wedge-shaped probe 216, the path of exploration through the pulp would be increased in width over sixfold as may be seen in FIG. 10, and here again the differential would be to small. In other words, if a tubular sectionizing tool is of sufficient outside diameter to serve as a nozzle and to serve as a conduit to convey water to the nozzle, the sectionizing tool is necessarily too large in cross section to serve as a probe to explore the fruit pulp for the purpose of detecting a radial fruit membrane. It is apparent therefore that either unduly reducing the width of the leading edge of applicants' probe or unduly increasing the width results in such a low resistance differential as to make the apparatus inoperative for its purpose.

In the Shrewsbury U.S. Pat. No. 3,081,805 the exploratory probe is a solid metal rod and a friction clutch is employed to detect a radial fruit membrane. In the Shrewsbury U.S. Pat. Nos. 3,030,995 and 3,022,016 the sectionizing tool is a tubular conduit to discharge a jet of water but the sectionizing tool is not used to explore the pulp. Instead, the tubular sectionizing tool is moved solely axially to penetrate a fruit.

A feature of the present invention is the discovery that while a tubular conduit is too wide to carry out the function of an exploratory probe, nevertheless it can be sufficiently flexible to distinguish by its flexure between the resistance by the fruit pulp and the resistance by the radial membrane to the exploratory travel through the fruit of the wedge-shaped probe 216 with its rounded nose.

Accordingly, the sectionizing tool comprises a relatively long tubular nozzle of a desired degree of flexibility and a relatively short axial extension in the form of a rigid blade to serve as a probe, the blade being wedge-shaped with a rounded leading edge. Thus, the fruit sectionizing tool is devided into two longitudinal sections, the shorter lower section being constructed to function as a specialized exploratory probe, the larger upper section being a tool body which is sufficiently yieldable to serve as means to detect the difference between the resistance to the travel of the probe offered by the fruit pulp and the resistance to travel offered by the radial membrane. In effect, the yielding of the body portion that is caused by the resistance to rupture of the radial fruit membrane is used as a control signal to terminate the rotation of the fruit relative to the sectionizing tool and to initiate the sectionizing stroke of the tool.

Structural Details of the Cups (FIGS. 7, 19–21, 23, 30, and 32)

As best shown in FIG. 23, each of the cups 74 is preferably made of elastomeric material with a relatively thin outwardly flared rim 122, the thickness of the wall of the cup progressively increasing towards the bottom of the cup where the wall is relatively thick. The elastomeric material permits the cup to conform to fruit that is out of round. In the construction shown, the periphery of the base portion of the cup is formed with a slot 124 of tapered cross section which locally weakens the cup and permits the cup to flex locally for what may be termed an outward hinge action. The cup 74 is dimensioned to embrace the smallest diameter fruit of a run ahd the cup yieldingly expands to embrace larger fruit, the peripheral slot 124 facilitating the yielding expansion. It is contemplated that at least the lower half of the fruit will be firmly embraced by the cup.

As shown in plan in FIG. 21 and indicated in FIG. 23, each of the cups 74 has a quadrant portion cut away to form a discharge opening 125 to permit the successively severed fruit sections to drop out of the cup and each cup is further cut away to provide an inner vertical slot 126 at the discharge opening to clear the inner edge of the corresponding sectionizing tool means. Each of the cups 74 is preferably further provided with an upwardly extending conical boss 127 in the bottom of the cup to penetrate the natural axial cavity 128 of the fruit, the conical boss being dimensioned to fill the bottom portion of the natural cavity that has been previously expanded by the tapered enlargement 120 at the base of the corresponding loading spike 62. Thus, the conical boss 127 of a cup cooperates with the conical base of a corresponding loading spike 62 for radial expansion of the fruit relative to the tines 66.

The manner in which the cups 74 are movably mounted on the lower fixed support structure 85 is shown in FIGS. 7 and 20–22. Each of the stems 75 that supports a cup 74 is slidingly mounted in suitable collars 130 of the fixed structure 85 and the lower end portion of each stem is rigidly connected by a bracket 134 to the lower end of a piston rod 135 that extends downwardly from a corresponding fixed air cylinder 136. Each of the stems 75 is formed with closely spaced ratchet teeth 138 which, as best shown in FIG. 22, cooperate with a corresponding pawl 140 that is formed with similar teeth, the pawl being mounted on a pivot 142. The pawl is biased towards engagement with the ratchet teeth 138 by a suitable spring 144 with the bias limited by a corresponding set screw 145.

Each of the pawls 140 freely permits upward movement of the corresponding stem 75 to permit the corresponding cup to move upwardly under air pressure until the cup forces the corresponding fruit against the corresponding stripper 70 of the corresponding fruit holder 65. All of the strippers 70 are forced to their upper limit positions to place the upper ends of the nine fruit at a common level, which level is indicated by the line 146 in FIG. 32. Since the nine pieces of fruit vary in size, the extent to which the cups 74 are extended upwardly by the nine air cylinders 136 varies accordingly. The pawls 140 prevent downward retraction of the cups but subsequently all of the pawls 140 are released simultaneously to permit retraction of the nine cups 74 after a sectionizing operation is completed.

The pawls 140 that cooperate with the stems 75 of one row of the cups are mounted on a horizontal release bar 146 and the pawls for the second row of cups are mounted on a second horizontal release bar 148. The two release bars 147 and 148 are connected, respectively, to the opposite arms of levers 150 (FIGS. 20 and 21) that are mounted on pivots 152. As best shown in FIG. 20, a bracket 154 is mounted on the underside of the release bar 148 and is connected to the piston rod 155 of an air cylinder 156 that is mounted on the fixed structure 85. Normally, the air cylinder 156 is energized in a direction to maintain all of the pawls 140 in cooperative relationship with the ratchet teeth 138 of the cup stems 75. When the air cylinder 156 is energized in the opposite respect the levers 150 rock clockwise as indicated by the arrows in FIG. 21 to a limit position determined by a stop screw 157 to retract all of the pawls 140 simultaneously thereby to release all of the stems 75 for downward retraction of the cups 74 at the end of a sectionizing operation.

Figure 33:
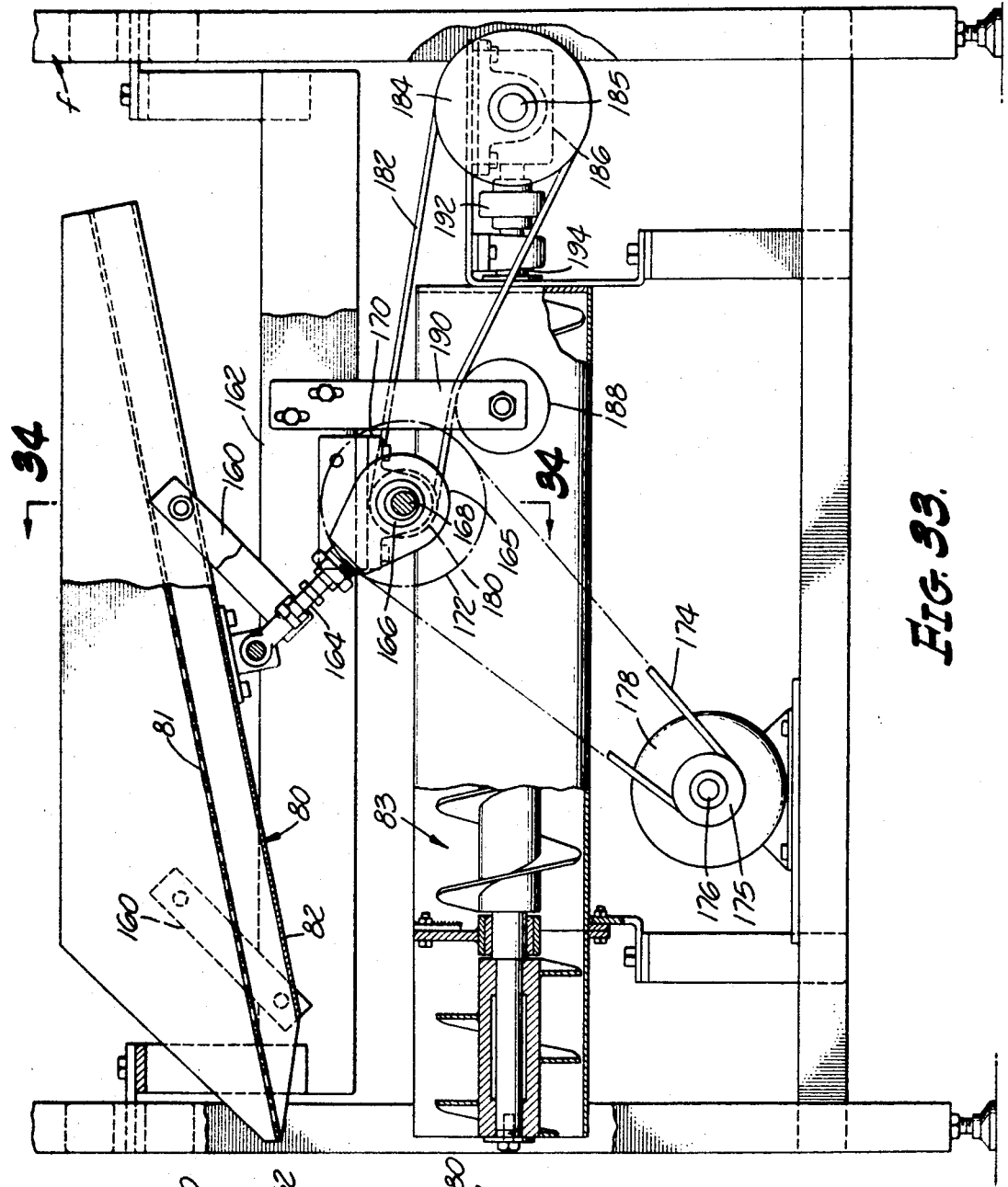
FIG. 33 is a view partly in section and partly in elevation as seen along the line 33—33 of FIG. 7.
Figure 34:
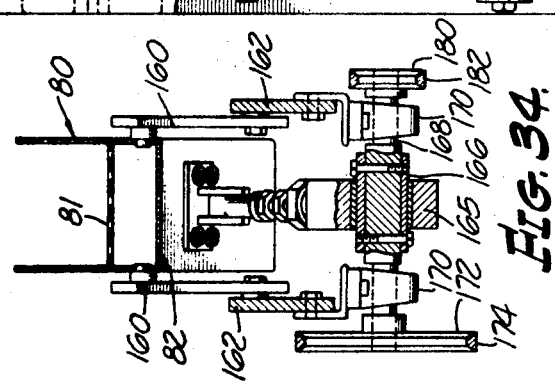
FIG. 34 is a fragmentary section taken along the line 34—34 of FIG. 33.

As shown in FIG. 7, the lower support structure 85 for the nine cups 74 carries a baffle 158 to guide fruit residuals into the screw conveyor 83 and also carries the previously mentioned inclined baffle 79 to guide the successive released fruit sections onto the discharge chute 80. As shown in FIGS. 33 and 34, the discharge chute 80 is mounted by a pair of parallel links 160 on a fixed member 162 and is operatively connected by a link 164 to a sleeve 165 on an eccentric 166. The eccentric 166 is carried by a cross shaft 168 which is journalled in bearings 170 and which is driven by a sheave 172 thereon which in turn is driven by a belt 174 from a sheave 175 on the shaft 176 of a motor 178. The rapid vibration of the inclined discharge chute 80 by the eccentric 166 causes the sections of fruit to gravitate down the inclined perforated web 81 for discharge from the lower end of the chute and the seeds drop through the perforated web onto the bottom wall 82 to gravitate to the lower discharge end of the bottom wall.

For the purpose of actuating the screw conveyor 83, a sheave 180 on the cross shaft 168 is connected by a belt 182 to a sheave 184 on the input shaft 185 of reduction gearing in a gear box 186. The belt 182 is tightened by an idler 188 on an adjustable bracket 190. The output shaft of the reduction gearing is connected by a coupling 192 to the shaft 194 of the screw conveyor.

Structural Details of the Sectionizing Tools (FIGS. 7–10, 15, 19, and 23–28)

As shown in FIGS. 7, 15, and 19, the vertically reciprocative frame 88 which carries the sectionizing tools comprises a cylinder 195 with opposite end flanges 196 which are mounted on opposite end plates 197. Each of the two end plates carries two pairs of rollers 202 by means of which the frame is movable along two fixed vertical guide rods 204. Rigidly mounted on the cylinder 195 are four short horizontal tubes 205 carrying a row of four sectionizing tool heads 206 and five longer horizontal tubes 208 carrying a second row of five sectionizing tool heads. The cylinder 195 and the various tubes 205 and 208 serve as conduit means for delivering water to the nine tool heads 206 and for this purpose the cylinder 195 is connected to a high pressure water source by a flexible hose 210 (FIG. 19). The vertical frame 88 is actuated by a central piston rod 212 (FIGS. 7 and 19) which extends downwardly from an air cylinder 214 (FIG. 7).

The sectionizing tool means 72 carried by each of the nine tool heads 206 comprises a pair of sectionizing tools, one tool 215 of each pair being relatively long by virtue of a relatively long probe 216 formed by its leading end, the other tool 218 being a shorter tool by virtue of a shorter probe 220 (FIGS. 8 and 10) at its leading end. As best shown in FIGS. 23 and 24, each of the tool heads 206 has an angular water passage 222 in communication with the corresponding tube 205 or 208 and two passages 223 of smaller cross section respectively place the angular passage in communication with the upper ends of the two tools 215 and 218.

Figure 9:
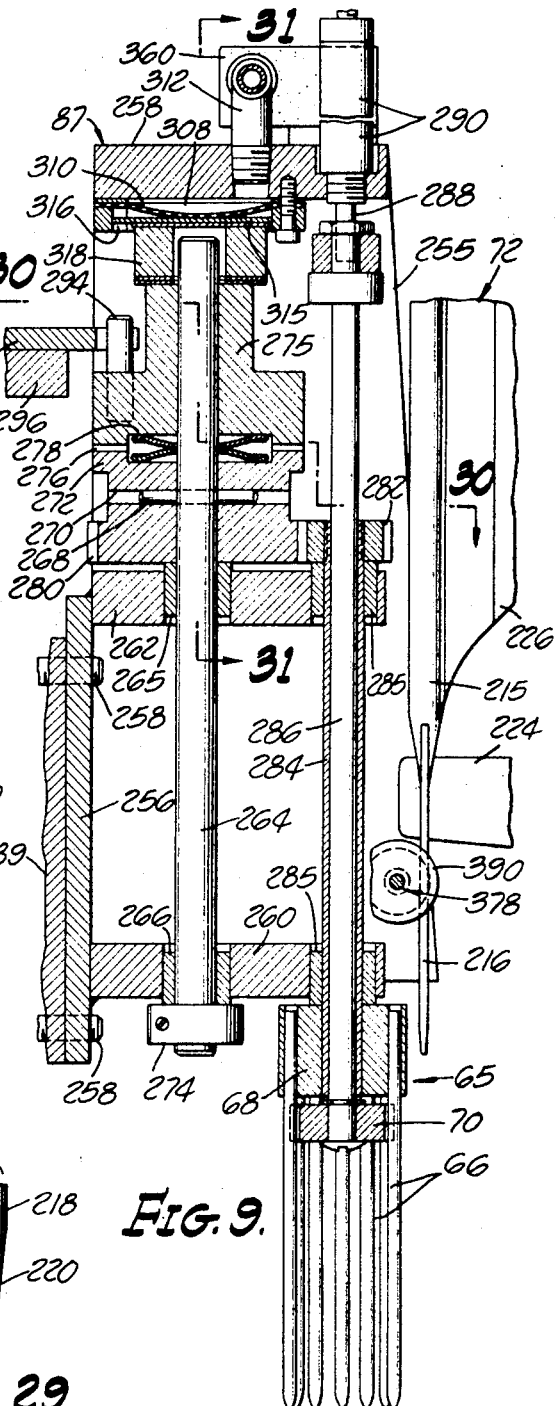
FIG. 9 is a vertical section along the line 9—9 of FIG. 8 showing an engaged clutch.

There is a tendency for a portion of a fruit to wedge between the two sectionizing tools 215 and 218 and to remain therein as the tools return to their upper starting positions. To combat such wedging action, a suitable stripper finger is fixedly mounted on the frame of the apparatus in position to extend between each pair of sectionizing tools. FIGS. 9, 23, and 25 show the effective end 224 of one of the stripper fingers.

Figure 10:
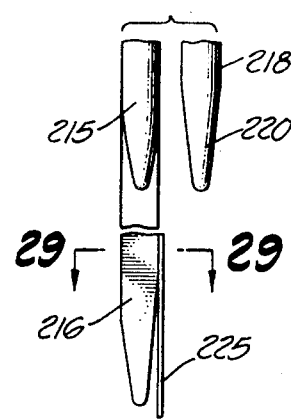
FIG. 10 is a fragmentary elevational view of the ends of a pair of sectionizing tools with the lower tool end in contact with a radial membrane of a fruit.

FIGS. 10, 26, and 28 show diagrammatically a radial membrane 225 of a citrus fruit and indicate how the two tools 215 and 218 are intended to straddle the membrane for the purpose of separating fruit sections from the opposite faces of the membrane. As shown in FIG. 25, each of the two sectionizing tools fixedly carries a laterally extending blade 226, the two blades being intended to extend close to the opposite faces of the radial membrane as shown in FIG. 25. As shown in FIG. 23, each of the blades 226 is dimensioned to extend radially of a citrus fruit beyond the perimeter of the fruit so that the blade will completely sever the natural string network of the fruit that initially encases the fruit sections. Each of the two blades 226 has an inclined leading edge 228 to facilitate severance of the network.

It can be seen in FIG. 23 that the leading edge 228 of the blade 226 is of double curvature in that it curves gradually away from the tool radially thereof and curves oppositely at the transition from the leading edge to the outer longitudinal edge of the blade.

Each of the two sectionizing tools 215 and 218 is of hollow construction to serve as a conduit for the pressurized water and each of the tools is formed with a pair of aligned relatively narrow slots 230 (FIG. 28) to serve as nozzles for discharging the pressurized water in thin streams as indicateed by the two arrows 232 in FIG. 26. The two thin jet streams converge on the fruit membrance 225 and are confined against the opposite sides of the membrane by the two blades 226.

As may be understood by reference to FIGS. 26, 27, and 28, the pair of thin nozzle slots of a tool 215 or 218 may be formed by locally cutting away one side of the tool to provide a pair of flat faces 234 separated by a narrow rib 235 and by cutting an opening 236 of elongated cross section through the wall of the tool to place the two faces in communication with the interior of the tool. A metal plate 238 is then welded to the side of the tool in spaced relation to the two flat faces 234 to form the desired two nozzles or slots 230. As may be seen in FIG. 23, the tubular portions of each pair of sectionizing tools 215 and 218 are aligned with a previously mentioned vertical slot 125 in the corresponding cup 74.

The Operating Cycle of a Pair of Sectionizing Tools (FIGS. 35–42)

FIG. 442 shows diagrammatically a typical citrus fruit held by the tines 66 of a rotary fruit holder 75 with the fruit supported from below by a cup 74 having a side opening 125 with a slot at 1126 at one edge of the opening 125 with a slot at 126 at one edge of the opening to clear the pair of sectionizing tools 215 and 218. The two tools have corresponding blades 226 that extend beyond the periphery of the fruit. It is assumed that the tines 66 of the fruit holder intermittently rotate the peeled fruit clockwise as viewed in FIG. 42.

Figure 35:
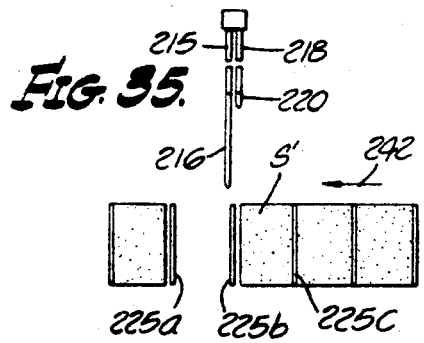
FIGS. 35–41 are diagrammatic views representing successive stages in a sectionizing operation.
Figure 36:
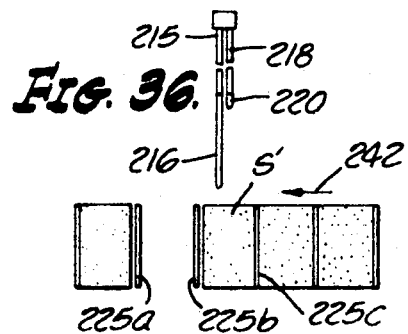
Figure 37:
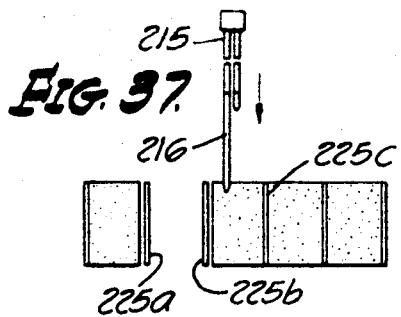

The successive stages in the operating cycle of the pair of tools 215 and 218 are shown in FIGS. 35–41. At the beginning of the cycle which is represented by FIG. 35, it is assumed that the pair of tools 215 and 218 have successively straddled two radial membranes 225a and 225b of the fruit (see FIG. 42) with the consequent removal of a section of the fruit that is bounded by the two membranes. In FIG. 35 the two tools 215 and 218 are poised to begin an operation which will involve straddling th next radial membrane 225c for the purpose of removing the next fruit section S'. Since the two tools 215 and 218 are aligned with the radial membrane 225b that has just been processed, the first step in the cycle is for the fruit to be rotated in the direction indicated by the arrow 242 (see also FIG. 42) by an increment sufficient to cause the pair of tools to step over the membrane 225b into alignment with the section S' in the region of the membrane 225b. Thus, this initial rotation to step over a processed membrane may be termed the stepping rotation of the fruit, the result being alignment of the pair of tools with the next fruit section S' as shown in FIG. 36. There is now a pause in the rotation of the fruit to permit the long probe 216 of the long tool 215 to lightly penetrate section S', as shown in FIG. 37, the pair of tools being slowly lowered during the pause for this purpose.

With the long probe 216 partially penetrating the fruit as shown in FIG. 37, the slow downward movement of the two tools continues and at the same time rotation of the fruit is resumed in the direction of the arrow 242. Since the resumption of the rotation of the fruit is for the purpose of causing the long probe 216 to search for the next radial membrane 225c, this second rotation of the fruit may be aptly termed the search rotation. With the two tools moving downwardly slowly during the search rotation, the long probe 216 progressively penetrates the fruit section S' as the next membrane 225c moves laterally towards the long probe. The search rotation is automatically terminated in response to impingement of the membrane 225c against the long probe 216 and shortly thereafter the downward travel of the two tools is accelerated for the sectionizing stroke illustrated by FIG. 40 wherein the two tools 216 and 218 straddle the membrane 225c to release the section S'. At the end of the sectionizing stroke the two tools return upwardly to their starting positions shown in FIG. 41 and are now ready for stepping rotation of the fruit in the direction of the arrow 242 in preparation for severance of the next fruit section.

To carry out this cycle of operations for removing the successive sections of a fruit, the invention provides means to cause the fruit to repeatedly make a stepping rotation followed by a pause and then a search rotation and the invention further provides what may be termed indexing means to terminate the search rotation of each of the nine citrus fruit in response to impact of a radial membrane 225 of the fruit against the long probe 216 of the corresponding tool 215. The means for intermittently rotating the fruit in this manner will now be described and subsequently the indexing means for terminating the search rotation of each of the nine individual fruit will be described.

Means to Cause Intermittent Rotation of a Plurality of Fruit (FIGS. 7, 8, 9, 15–19, 23, 30, 31, 41, and 43)

Figure 8:
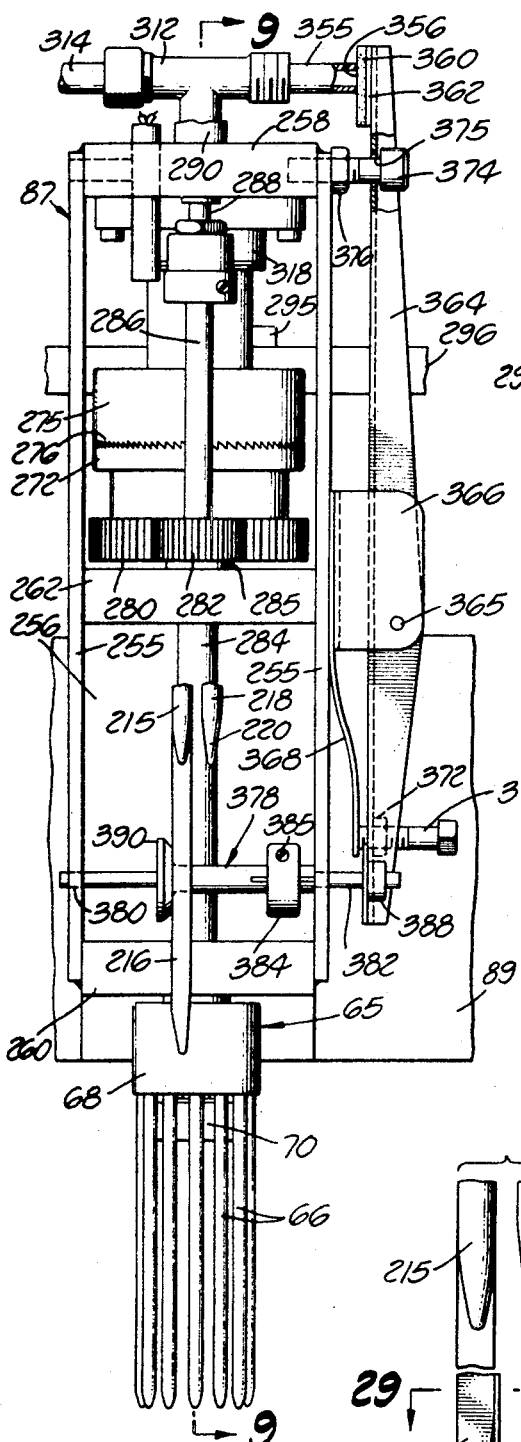
FIG. 8 is an enlarged fragmentary section taken along the line 8—8 of FIG. 7.

As best shown in FIGS. 8 and 9, each of the eight clutching housings 87 has: two opposite side walls 255; a shorter forward wall 256 that is attached by screws 258 to the carriage beam 89; a top wall 258; a bottom wall 260; and a transverse wall 262 at an intermediate level, th various walls being welded together to form a rigid box-like structure.

An upright shaft 264 which is journalled in fixed sleeve bearings 265 and 266 is supported by a diametrical pin 268 which extends through a diametrical bore 270 in a lower clutch member 272. The lower clutch member 272, in turn, is supported by the upper sleeve bearing 265. The lower end of the shaft 264 protrudes below the lower sleeve bearing 266 and carries an adjustable split collar 274.

An upper clutch member 275 is both rotatably and slidably mounted on the upper end of the shaft 264 and, as may be seen in FIG. 8, the two clutch members 272 and 275 have clutch teeth 276 for mutual engagement. The clutch teeth are inclined in one rotary direction to permit the upper clutch member to drive the lower clutch member in the one rotary direction while permitting independent rotation of the lower clutch member in the same rotary direction. Normally, the two clutch members 272 and 275 are disengaged by intervening leaf spring means 278.

The lower clutch member 272 serves as a drive gear and for this purpose is formed with outer circumferential teeth 280 to mesh with a driven pinion 282 that is operatively connected to the associated fruit holder 65. In the construction shown the head 68 which carries the tines 66 of the fruit holder 65 is mounted on a tubular shaft 284 that is journalled in two fixed bearing sleeves 285. The pinion 282 is fixedly mounted on the upper end of the tubular shaft and supports the tubular shaft by resting on the upper sleeve bearing 285.

The previously mentioned stripper 70 of the holder 65 is mounted on the lower end of a vertical rod 286 that slidingly extends through the tubular shaft 284, the upper end of the rod 286 being connected to a piston rod 288. The piston rod 288 extends downwardly from an air cylinder 290 which is mounted on the top wall 258 of the clutch housing and extends upwadly from the clutch housing as best shown in FIG. 7. A suitable flexible hose 292 connects each of the air cylinders 290 to a suitable source of compressed air under the control of suitable valve means as will be described later. It is apparent that with the upper clutch member 275 serving as drive means, the two clutch members may be engaged to rotate the tines 66 of the corresponding holder 65 and that the stripper 70 inside the set of tines may be lowered by energization of the upper air cylinder 290 to strip fruit residue from the tines.

Within the scope of the invention any suitable means may be provided to rotate the nine upper clutch members 275 for the purpose of rotating the nine fruit holders 75. In the present embodiment of the invention the upper clutch collars are intermittently oscillated and for this purpose each of the upper collars is provided with an upwardly extending pin 294 that is oscillated by a corresponding reciprocative fork member 295.

As shown in plan in FIG. 19, the nine fork members 295 are rigidly mounted on a reciprocative transverse bar 296 which may be termed an indexing bar and which is slidably mounted on the carriage 86 by means of two pairs of rollers 298 (FIG. 15) mounted in two corresponding brackets 300. As shown in FIG. 15, the index bar 296 is connected by an angular bracket 302 to the piston rod 304 of an air cylinder 305, the air cylinder being fixedly mounted on the horizontal carriage 86 by a bracket 306.

For the purpose of depressing each of the upper clutch members 275 into engagement with the corresponding lower clutch member 272 in opposition to the corresponding intervening leaf spring means 278, the upper end of each clutch housing 87 is provided with an air chamber 308 (FIG. 9) having a lower movable wall in the form of a diaphragm 310. The air chamber 308 is connected by a tee fitting 312 and a corresponding flexible hose 314 with a source of compressed air. When the air in the air chamber 308 is under pressure the diaphragm 310 presses downwardly, as shown in FIG. 9, against a non-rotatable guide plate 315 that is vertically movable in a suitable guideway 316. The guide plate 315 carries on its lower face a relatively thick ring 318 which surrounds the upper end of the shaft 264 with liberal radial clearance and is adapted to exert downward pressure on the upper clutch member 275 to overcome the resistance of the leaf spring means 278.

As heretofore stated, the vertical reciprocative frame 88 that carries the sectionizing tools is operatively connected to the various fruit holders 65 on the horizontally reciprocative carriage 86 for the purpose of rotating the holders in synchronism with the vertical movements of the sectionizing tools. In the present embodiment of the invention this purpose is served by an upright cam 320 (FIG. 15) which is mounted on the forward edge of one of the end plates 197 of the vertical frame 88. As shown in FIG. 16, the upright cam 320 has a straight back edge 322 and when the horizontal carriage 86 returns from its forward loading position to its normal rearward operating position, a backup roller 324 mounted by a bracket 325 on the horizontal carriage is positioned against the straight back edge 322 to reinforce the cam against the reaction of the loading of the cam.

A second roller 326 which functions as a cam follower is mounted by a bracket 328 (FIG. 15) on the end of the previously mentioned index bar 296 to cooperate with the cam 320 for intermittently longitudinally reciprocating the index bar to oscillate the various upper clutch members 275. When the air cylinder 305 is energized to urge the index bar 296 to the right as viewed in FIG. 15, the follower roller 326 is pressed against the working surface of the upright cam 320 and when the air cylinder is energized to urge the index bar to the left the follower roller 326 is retracted from the working surface to make the transverse bar non-responsive to the cam. When the cam 320 is carried downwardly by the vertically reciprocative carriage 88 on which it is mounted, the air cylinder 305 is automatically energized in one respect to make the index bar 296 responsive to the cam and the air cylinder is energized in opposite respect to retract the follower roller 326 during the return upward movement of the vertical frame 88.

As best shown in FIG. 16, the cam 320 is longitudinally adjustable relative to the end plate 296 of the vertical frame 88 on which the cam is mounted and for this purpose the cam is provided with three spaced longitudinal slots 330, 331, and 332 with corresponding cap screws 333, 334, and 335 extending through the slots into the end plate. For cooperation with the follower 326 the cam 320 has a first sloping shoulder 336 followed by a relatively short dwell 338 leading to a second sloping shoulder 340 with the second sloping shoulder leading to a relatively long dwell 342.

Figure 38:
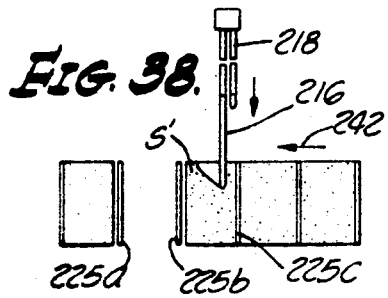
Figure 39:
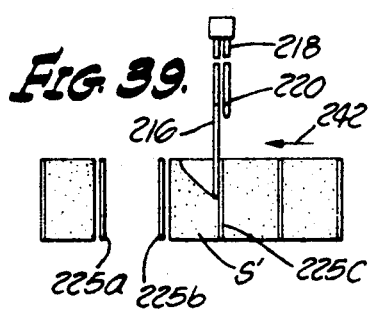
Figure 40:
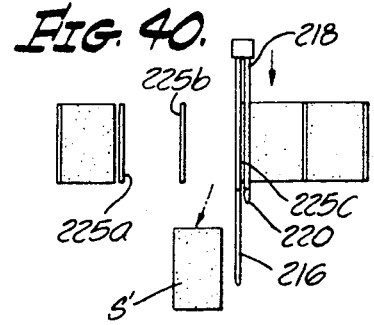
Figure 41:
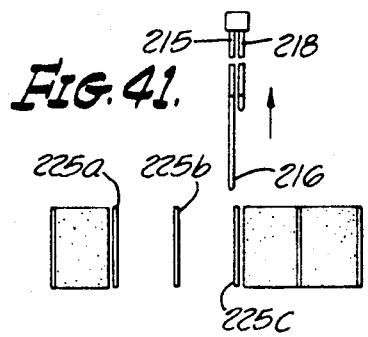

The first sloping shoulder 336 of the cam 320 cooperates with the follower 326 to carry out the initial stepping rotation of the fruit that is represented by FIGS. 35 and 36 during the period in which the vertical frame 88 initially moves downwardly at a relatively slow rate; the first dwell 338 causes the pause in the rotation of the fruit to permit the long probe 216 to make initial penetration of the fruit as indicated by FIGS. 36 and 37; the second sloping shoulder 340 of the cam creates the search rotation of the fruit as the vertical frame continues to move downwardly slowly as indicated by FIGS. 38 and 39; and the second long dwell 342 permits the fruit to pause while the vertical frame 88 accelerates rapidly downwardly to cause the sectionizing tools to make the sectionizing strokes that are represented by FIGS. 39 and 40.

It is to be noted that the search rotation of the various fruit holders 65 that is caused by the second sloping shoulder 340 is of sufficient extent to accommodate the widest section of a fruit that can ordinarily be expected. Therefore, the search rotation of each individual fruit will usually be terminated in a mucy lesser time period in which a probe traverses a fruit section of much less than the maximum width.

The cam 320 is adjustable to vary the rate and extent of the initial stepping rotation of the fruit and for this purpose the first sloping shoulder 336 is formed by an adjustable cam section 344 in the form of a flat insert plate that is adjustably confined between two webs 345 of the cam (FIG. 17). The previously mentioned lowermost cap screw 335 not only extends through the lowermost longitudinal slots 332 of the two webs 345 of the cam but also extends through a bore 346 in the insert plate 344 (FIGS. 17 and 18), which bore snugly fits the cap screw. The insert plate 344 is provided with a second oversized bore 348 to receive a cap screw 350 that is provided with a nut 352. The cap screw 350 extends through longitudinal slots 354 in the two webs 345 of the cam. The oversized bore 348 permits the insert plate 344 to be adjustably rotated about the axis of the cap screw 335.

It is apparent that the three screws 333, 334, and 335 may be loosened to permit longitudinal bodily shift of the cam 320 to vary the position of the inclined cam shoulder 340 relative to the vertical frame 88 thereby to vary the timing of the search rotation relative to the downward movement of the sectionizing tools. It is also apparent that the position of the insert plate 344 longitudinally of the cam 320 may be varied to vary the effective length of the dwell 338 to vary the duration of the pause that occurs between the stepping rotation and search rotation of the fruit holders 65. In addition, the magnitude of the initial stepping rotation may be varied by varying the degree to which the insert plate 344 protrudes from the plane of the dwell 338 and the rate of the initial stepping rotation may be varied by varying the slope of the insert plate 344 relative to the plane of the dwell 338. Thus, the adjustability of the cam 320 makes it possible to adjust the operation of the sectionizing tools as required for different runs of fruit. As heretofore stated, if the pulp of the fruit is relatively soft with the radial membranes relatively fragile, adjustment will be made for deeper penetration of the fruit by the sectionizing tools during the search rotation of the fruit.

It is apparent that to carry out the rotation of the nine fruit holders 65 it is necessary that the nine clutches be engaged while the follower roller 326 traverses the first sloping shoulder 336, the dwell 338 and the second sloping shoulder 340 of the cam 320. For this purpose a control valve that will be identified later supplies compressedd air simultaneously to the nine air chambers 308 for a period of time of sufficient duration to permit the follower 326 to reach the bottom of the second sloping shoulder 340 of the cam.

FIG. 43 shows graphically the various relationships involved in the intermittent rotation of the fruit holders 65. As indicated in FIG. 43, the downward movement of the vertical frame 88 that carries the sectionizing tools is relatively slow until the follower 326 reaches the relatively long second dwell 342 and then the downward movement is accelerated to carry out the sectionizing stroke. FIG. 43 shows that the air cylinder 305 is energized in the direction to press the follower 326 against the cam 320 until near the end of the downward stroke of the sectionizing tools, the air cylinder being energized in the opposite respect to retract the follower during the return upward movement of the sectionizing tools. FIG. 43 also shows how the configuration of the cam 320 is related to the initial stepping rotation, the first pause, the search rotation, and the final pause in the rotation of the fruit. FIG. 43 further indicates that air is supplied to all nine of the air chambers 308 until the permitted time period for search rotation is ended by the arrival of the follower 326 at the bottom of the second sloping shoulder 340.

Means to Index the Rotation of the Fruit Holders in Accord with the Locations of the Radial Membranes of the Corresponding Fruit. (FIGS. 8, 9, 30, 31, and 41)

As stated above, a suitable control valve supplies compressed air to all of the air chambers 308 for a time period sufficient for the follower roller 326 to traverse the length of the sloping shoulder 340 for simultaneous search rotation of the nine fruit holders. The remaining requirement, therefore, is for some provision to override the control by the control valve to cause the clutch associated with each fruit holder to be disengaged automatically in response to impinegement of the next radial membrane of each fruit aginst the long probe of the corresponding sectionizing tool. The necessary overriding of the effect of the control valve is achieved simply by venting each of the air chambers 308 to drop the air pressure therein when the corresponding sectionizing tool senses impingement of a radial membrane of the corresponding rotating fruit.

For this purpose the previously mentioned tee fitting 312 (FIG. 8) at the top of each of the clutch housings 87 is equipped with a nipple 355 which forms a bleeder or vent port 356 of sufficient flow capacity to reduce the pressure effectively in the corresponding air chamber 308 even though compressed air is being delivered to the air chamber. Normally, the bleeder port 356 is closed by a valve member comprising a layer 360 of elastomeric material on a backing plate 362.

The backing plate 362 is carried by the upper arm of a lever 364 that is mounted by a pivot 365 on a bracket 366 on one side of the corresponding clutch housing 87. A suitable leaf spring 368 that is fixedly mounted on the bracket 366 abuts an adjustment screw 370 on the lever 364 for the purpose of normally pressing the valve member against the bleeder port 356. A lock nut 372 on the adjustment screw 370 maintains any adjustment to which the screw may be set. Preferably, suitable stop means is provided to limit the swinging movement of the lever 364 away from the bleeder port 356. In the construction shown, the stop means is the head of a screw 374 that extends through an aperture 375 of the lever, the screw being threaded into the corresponding clutch housing 87 and being provided with a stop nut 376.

The lower arm of each of the levers 364 may be operatively connected with the corresponding long sectionizing tool 215 in any suitable manner. In the construction shown, each of the clutch housings 87 carries an operating member 378 (FIG. 8) for this purpose. One end of the operating member is slidingly mounted in a bore 380 of one side wall of the clutch housing 87 with the second end of the operating member normally abutting the opposite side wall. The second end of the operating member 378 is bored and longitudinally split to receive an adjustable axial extension 382. A split collar 384 provided with a screw 385 embraces the split end of the operating member to maintain any desired adjustment of the axial extension 382. The axial extension 382 extends through an aperture in the lower end of the lever 364 and has an integral collar 388 to engage the lever for the purpose of rocking the lever to open the bleeder port 356.

The operating member 378 has a bevelled radial flange 390 which, as shown in FIG. 8, is adjacent one side of the long probe 216 of the corresponding sectionizing tool 215 when the horizontal carriage 86 is at its normal rearward operating position shown in FIG. 7. Since tht suspended sectionizing tool 215 is relatively long, it is sufficiently flexible to yield laterally in response to impinegement of a radial membrane of a rotating fruit against the lower end of the tool. Thus, when the fruit on the corresponding holder 65 is actuated for search rotation to move a radial membrane of the fruit towards the probe 216, the impingement of the radial membrane on the probe shifts the operating member 378 to the left as viewed in FIG. 8 with consequent opening of the bleeder port 356 to terminate the search rotation of the fruit. Thus, as may be understood by reference to FIG. 43, the bleeder ports associated with the different sectionizing tools will open at different times towards the end of the period allowed for search rotation with consequent disengagement of the corresponding clutches to terminate the search rotation of the corresponding fruit holders 65.

Preferably, the probe 216 of the long sectionizing tool 215 is of the general cross section shown in FIG. 29, which cross section is of the general character of a truncated triangle. The probe is tapered to a leading edge that makes contact with the membranes of the rotary fruit and the leading edge is narrow to reduce resistance to rotation of the fruit in which it is inserted. If the radius of curvature of the leading edge is less than 0.003 inch there is a likelihood that the probe will break through a weak membrane instead of sensing the membrane. On the other hand, a radius of curvature of 0.008 inch causes excessive resistance to rotation of the fruit. The preferred radius of curvature is 0.005 inch.

Modified Forms of the Cup (FIGS. 44–47)

FIG. 44 shows a cup 74a which may be substituted for the previously described cup 74. The cup 74a has a relatively thin flexible elastomeric wall 392 which is dimensioned to snugly embrace a fruit of relatively small diameter and readily expands elastically to embrace fruit of larger diameter. It will be noted that there is an angular transition in the region 394 where the thin wall of the cup joins a relatively heavy base portion 395. When fruit of relatively large diameter is inserted into the cup 74a, the circumferential wall of the cup tends to flex outwardly at the angular transition 394, the wall of the cup in effect hinging outwardly. Thus, the re-entrant configuration of the cup wall at the region 394 serves the same purpose as the outer peripheral notch 124 in the first described cup that is shown in FIG. 23.

Figure 42:
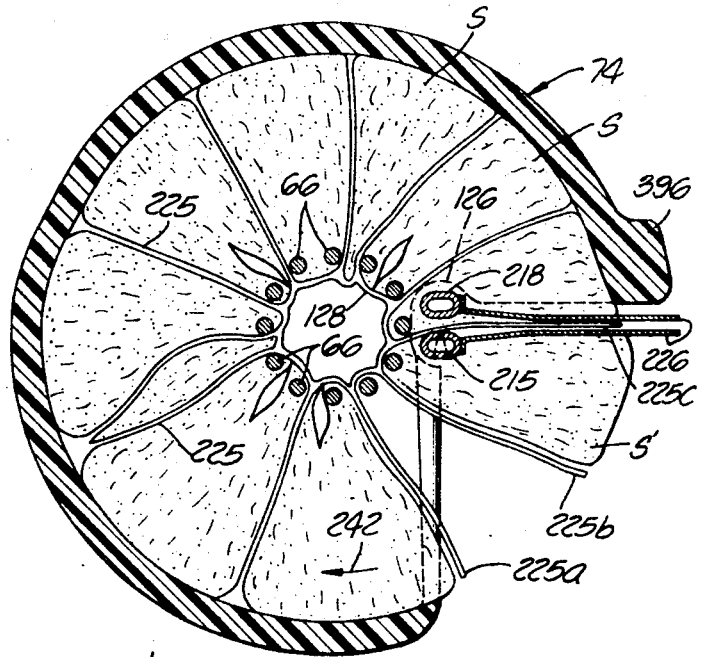
FIG. 42 is a diagrammatic sectional view showing a citrus fruit in cross section supported by a cup with a pair of sectionizing tools straddling a radial membrane of the fruit.

A feature of the cup configuration shown in FIG. 44 is that the circumferential wall 392 of the cup is greatly thickened by an external rib 396. The rib 396 is dimensioned and located as indicated in FIG. 42 where it is seen that the reinforcing rib 396 is adjacent the side opening 126 of the cup and is of approximately the width of a fruit section and reinforces whatever fruit section preceeds the fruit section S' that is being currently separated from the fruit.

The cup 74b shown in FIG. 45 differs from the cup configuration shown in FIG. 23 in the provision of a blunt axial boss 400 instead of the previously described tapered boss 127, the axial boss 400 being of larger diameter than the tapered boss. It is contemplated that the diameter of the axial boss 400 will be greater than the axial cavity of the fruit and, therefore, the bottom of a fruit in the cup will rest on the top of the boss as shown in FIG. 45.

It is to be noted that the outside diameter of the axial boss 400 is less than the inside diameter of the circular set of tines 66 to permit the tines to telescope over the axial boss. If a fruit in the cup 74b is of relatively large diameter, the tines 66 will not extend downwardly much beyond the level of the top of the axial boss 400 but if a fruit is substantially smaller than shown in FIG. 45, the tines will extend downwardly towards the base of the axial boss. Thus, the cup 74b permits a wide range in the diameters of the fruit that may be sectionized with the aid of the cup. It is apparent that the axial boss 400 makes it possible for the cup to force fruit of various sizes to the upper limit permitted by the stripper 70 so that all of the fruit in the nine cups will reach the previously mentioned predetermined level indicated by the line 146 in FIG. 32.

The cup 74c shown in FIG. 46 is largely similar to the first described cup in FIG. 23 but has two features. The first feature is that the bottom of the cup is provided with a relatively deep circular groove 402 the purpose of which is to provide clearance for the lower ends of the tines 66 when a relatively small fruit is positioned in the cup as shown. With larger fruit the tines will extend to lesser degree into the groove 402. Here again, the cup configuration permits the cup to force a relatively small fruit upwardly to the maximum against the corresponding stripper 70.

The second feature of the cup 74c is that the outwardly flared rim 404 of the cup is continuous along the circumference of the cup. Thus, as may be seen in FIG. 47, a quadrant opening 405 of the cup is spanned by a portion of the continuous rim 404. The advantage of this configuration is that the circumferential rim of the cup acts in hoop tension for effective embracement of the fruit in the cup, the cup yielding in hoop tension to accommodate relatively large fruit.

The Pneumatic System for Actuating the Various Working Parts (FIGS. 48a and 48b)

The principal control valves employed in the pneumatic actuating system include: valve 406 which is the previously mentioned control valve for supplying compressed air to the nine air chambers 308 to control the diaphragms 310; valve 408 to control the cylinder 305 that operates the index bar 296; valve 410 to control the air cylinder 214 for the upstroke of the vertical frame 88 that carries the sectionizing tools; valve 412 for controlling the same cylinder for the downstroke of the sectionizing tools; valve 414 for controlling an air actuated booster water pump that will be described hereafter; valve 415 to control the nine air cylinders 106 that respectively actuate the nine loaders 60; valve 416 to control the nine cylinders 290 for operating the nine strippers 70; valve 418 for controlling the nine cylinders 136 for controlling the nine cups 74 and for also controlling the cylinder 156 that disconnects the nine pawls 140 from the stems of the nine cups; and valve 420 for energizing the two cylinders 96 that actuate the horizontal carriage 86. As indicated in the drawings, each of these valves is a two-position valve operated by opposed solenoids and provided with detents to make the valve non-responsive to forces such as vibration.

It is to be noted in FIG. 48b that two restrictors 421, which may be suitable orifice members, are provided in the two lines that connect valve 418 to the nine cylinders 136 for controlling the nine cups 74, but no such restrictions interfere with flow from valve 418 to the cylinder 156 that disconnects the nine pawls 140 from the stems of the nine cups. By virtue of this arrangement the application of air pressure for lowering the nine cups is delayed until after the pawls release the stems of the cups.

A feature of the apparatus is that all of the various control valves are of a single model, the ports of which may be readily varied to make the valve function as a two-position three-connection valve or a two-position four-connection valve, or if desired, a two-position two-connection on and off valve. The above mentioned valves 408, 414, 415, 418, and 420 function as two-position four-connection valves and the valves 406, 410, 412, and 416 function as two-position three-connection valves. The particular valve employed for this purpose is known as "Numatics" Model 1JDSA4U which may be purchased from Numatics, Inc., Highland, Mich.

The above mentioned air-actuated water booster pump is generally designated 422 in FIG. 48b and comprises a cylinder 424 divided by a transverse wall 425 into an upper air chamber 426 and a lower water chamber 428. The water chamber 428 communicates with a water pump cylinder 430 of substantially smaller cross-sectional area than the air chamber 428. A piston 432 that reciprocates in the air chamber 426 is connected to an axial ram 434 that extends into the water pump cylinder 430 to function as a piston therein.

When the air piston 432 and the ram 434 are retracted as shown in FIG. 48b, water is supplied to the lower end of the water pump cylinder 430 by a supply line 435 from a two-position two-connection solenoid valve 436. When compressed air is admitted to the upper end of the air chamber 426, the consequent downward movement of the ram 434 ejects water at high velocity and high pressure from the water chamber 430 through a pipe 437 to a water manifold 438 which supplies the nine sectionizing tool means 72.

An air actuated two-position three-connection pilot valve 440 is connected to the upper end of the air chamber 426 by a line 442 and a second similar pilot valve 444 is connected to the lower end of the air chamber by a line 445. A line 446 connects the previously mentioned booster cylinder valve 414 to one side of the two pilot valves 440 and 444 and a second line 448 connects the valve 414 to the other sides of the two pilot valves. It is apparent that solenoid actuation of the valve 414 in one direction advances the ram 434 to supply high pressure water to the sectionizing tools and solenoid actuation of the valve in the opposite direction retracts the ram to admit a new charge of water.

Compressed air from a suitable source controlled by a manually operated master valve 450 is supplied to a supply line 452 that has one branch 454 to the valve 414 and to the pilot valve 444 with a second branch 455 connected to the other pilot valve 440. A supply line 456 branches from the supply line 452 and under the control of a two-position three-connection solenoid master air valve 458 supplies compressed air to a manifold 460 which is connected to the valves 206, 408, 410, 412, 414, 415, 416, 418, and 420 through corresponding regulators 461. A pressure switch 462 that is responsive to air pressure in the supply lines 452 and 456 prevents energization of the electrical control system if the air pressure is too low.

As heretofore stated, the vertical frame 88 that is actuated by air cylinder 214 and carries the sectionizing tools makes a downward strike that is initially relatively slow and subsequently relatively fast. For the purpose of controlling the air cylinder 214 in the desired manner, the upper end of the previously mentioned cylinder 214 is connected to the vertical down valve 412 by a line 463, the valve in one position supplying compressed air to the upper end of the cylinder and in the other position exhausting the upper end of the cylinder to the atmosphere. In like manner, a line 464 connects the vertical up valve 410 to the lower end of the air cylinder 214, one position of the valve supplying compressed air to the lower end of the cylinder, and the other position exhausting the lower end of the cylinder to the atmosphere. The line 464 is equipped with a variable restrictor 465 which is by-passed by a line 466 through a by-pass valve 468 which functions as a two-position two-connection on and off valve.

During the initial portion of the downward movement of the vertical frame 88 by the air cylinder 214, the by-pass valve 468 is closed and escape of air from the lower end of the air cylinder 214 is limited by the flow capacity of the variable restrictor 465. At the end of the desired period of time for slow downward movement of the sectionizing tools, the by-pass valve 468 is opened to permit rapid evacuation of the lower end of the air cylinder 214 thereby to cause the desired downward acceleration of the sectionizing tools.

Figure 49A:
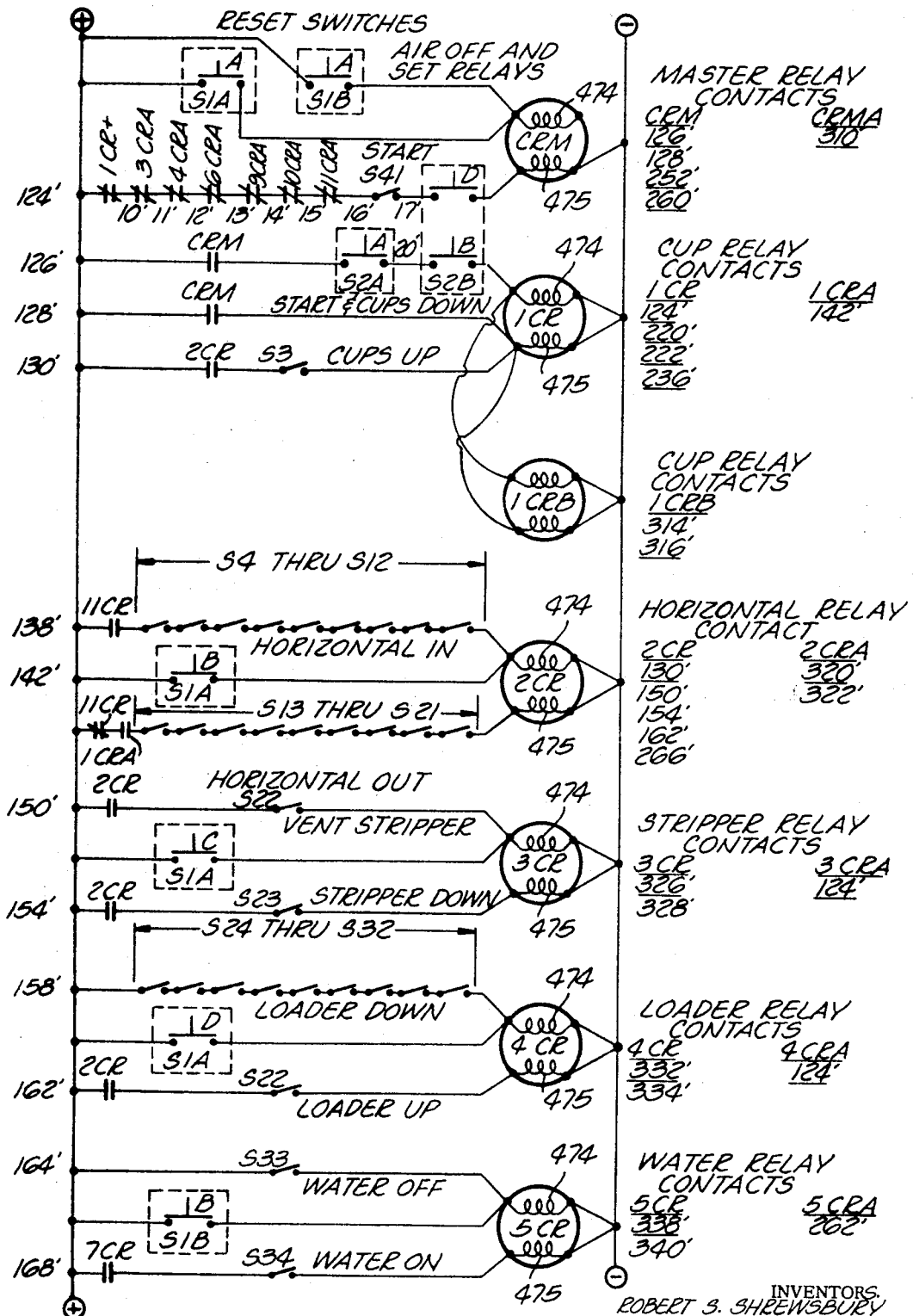
FIGS. 49a, 49b, and 49c, taken together constitute a wiring diagram of the electrical control system.
Figure 49B:
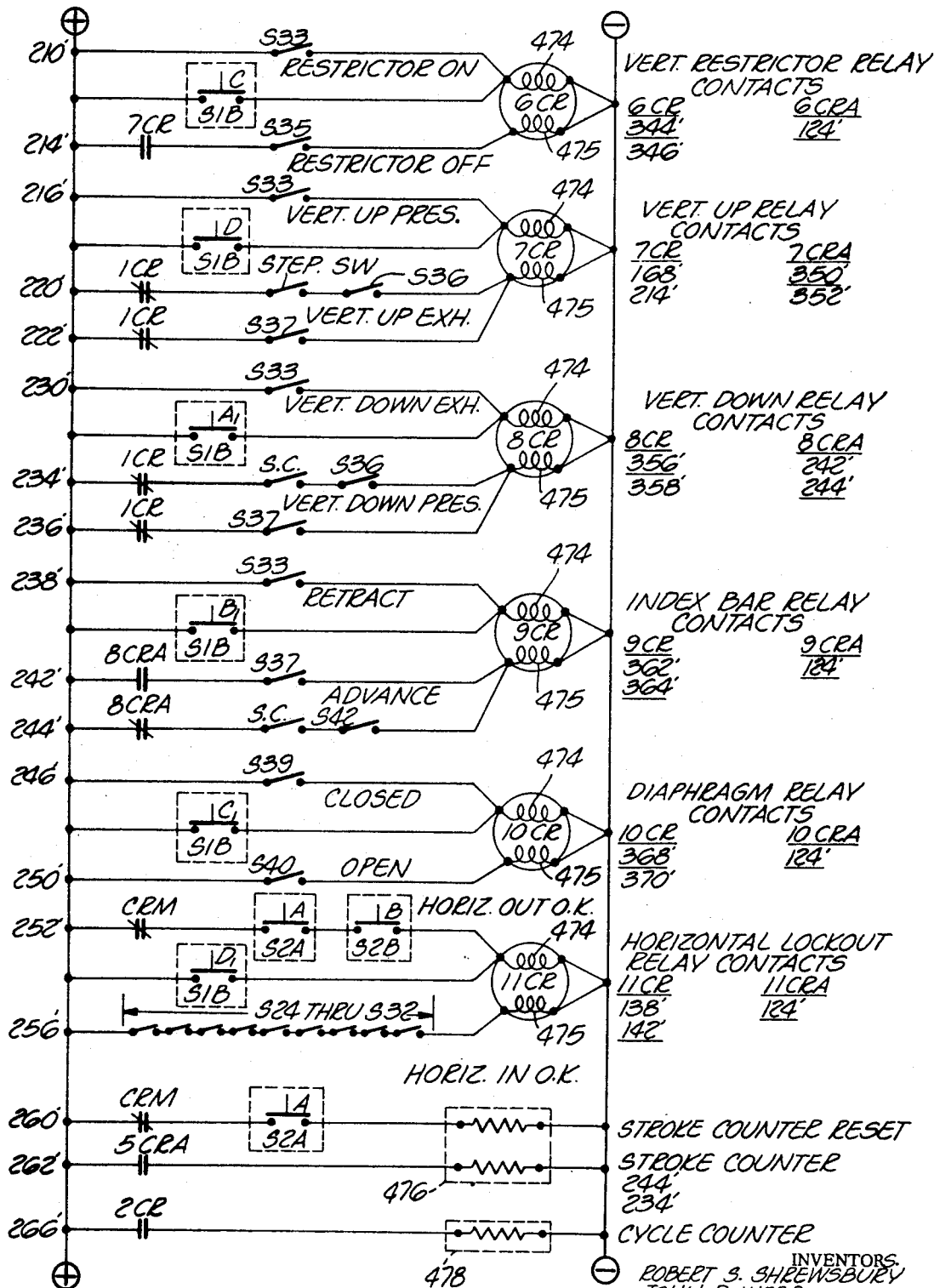
Figure 49C:
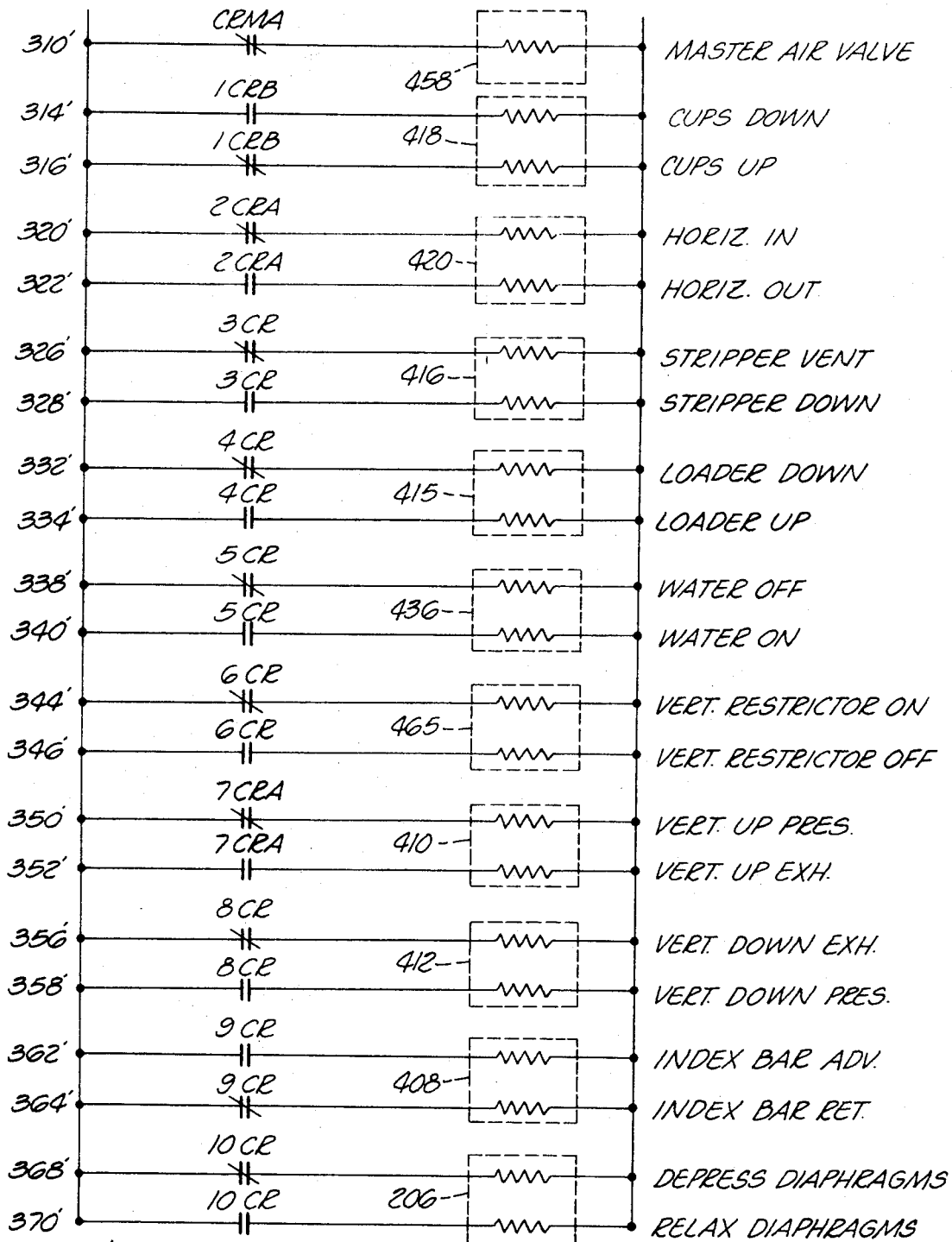

Wiring Diagram (FIGS. 49a–49c)

As may be readily understood, various reed switches are operated by corresponding permanent magnets on moving parts of the apparatus for carrying out the overall operating cycle. Examples of such reed switches are the previously mentioned reed switches 112 which are operated by corresponding permanent magnets 110 that are carried by the various loaders 60.

Figure 50:
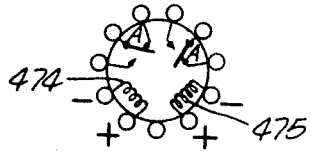
FIG. 50 is a diagram of a typical relay in the electrical control system.

In the wiring diagram relays CRM and 1CR through 11 CR are "bi-stable" or "latching" type control relays manufactured by C. P. Clare & Company, Chicago, Ill. As indicated in FIG. 50, each of the control relays incorporates a double-pole double-throw switch operated in opposite respects by two coils 474 and 475. In the wiring diagram the various lines across the circuit are designated by primed numerals 124'–370'. When the control relays are in their "normal" positions, relay contacts shown as normally closed in lines 310'–370' are closed to energize the appropriate solenoids of the various valves.

The electrical control system includes a predetermining electromagnetic counter 476 (FIG. 49b) which may be manually preset for any desired number of strokes for a sectionizing cycle. The counter may be the Series FA043 counter manufactured by Hengstler Numerics, Inc., Palisades Park, N. J. At the end of the predetermined number of strokes the vartical frame 88 that carries the sectionizing tools returns to its normal upper position in preparation for starting a new overall cycle of operation. A second counter 478 provides a cumulative count of the overall cycles of operation.

Since it is possible for an operator to leave the machine with various moving parts and assemblies out of position after a period for servicing or cleaning the machine, electrical interlocks are provided to prevent automatic operation unless the movable assemblies are in proper positions for starting the overall operating cycle. Dual start switches S2A and S2B (FIG. 49a) are positioned on opposite sides of the machine to require use of both hands of the operator. If the machine does not start when the two start switches are depressed simultaneously, one or more of the assemblies is out of position and the operator corrects the situation by depressing reset switches S1A and S1B. These switches have eight contacts each and are used to position the various control relays to their "normal" or starting positions.

When the relays are in their "normals" or start positions, relay contacts shown as normally closed in lines 310'–370' are closed to energize the proper solenoid coils of the previously described valves, which valves are shown diagrammatically by rectangles in FIG. 49c.

Depressing start buttons S2A and S2B opens master air valve 458 permitting any assembly, except the horizontal carriage, to return to normal position. The horizontal carriage must be positioned by manually operating the override switch S41 (line 124') before the cycle will start. The two start buttons also energize cup relays 1CR and 1CRB to switch normally open contacts 1CRB (line 314') to closed position to cause the cups to come down. When all of the cups reach the bottoms of their strokes, corresponding reed switches S13 through S21 close to energize relay 2CR, closing contacts 2CRA (line 322') causing the horizontal carriage to move it its out or forward position.

In the course of the forward movement of the horizontal carriage switch S23 (line 154') is actuated to energize relay 3CR closing contacts 3CR (line 328') causing the various strippers 70 to operate. Near the end of the forward travel of the horizontal carriage, switch S22 closes (lines 150' and 162') reversing relay 3CR causing stripper valve 416 to exhaust the stripper cylinders 290. The closing of switch S22 also energizes relay 4CR closing the relay contacts (line 334) to cause the loaders 60 to move to their upper positions. The loaders physically force the strippers 70 upwardly and when the strippers reach their upper limit positions under the pressure of the loaded fruit, corresponding switches S24 through S32 (line 158') are closed. Loader relay 4CR retruns to "normal" position and the loaders 60 move down and in doing so leave the fruit on the tines of the fruit holders 65. Switches S24 through S32 also energize horizontal lockout relay 11CR (line 256') to close contacts (line 138') and allow the horizontal carriage to return to its normal rearward operating position when all of the switches S4 through S12 (line 638') are closed by the downward return of the corresponding loaders 60.

When the horizontal carriage almost reaches its rearward operating position switch S3 (line 130') is closed to return relay 1CR to "normal" position closing 1CRB contacts (line 316') causing the cups 74 to go up. Near the top of the cup stroke switch S37 (lines 222', 236', and 242') is closed energizing relays 7CR, 8CR, and 9CR to close contacts (lines 352', 358', and 362') to actuate the valve 410 to exhaust air from the lower end of the air cylinder 214 of the vertical frame 88 and to operate solenoid valve 412 to supply pressure to the upper end of the cylinder 214 as well as to operate valve 408 to advance the index bar to advance the retracted follower 326 against the cam 340. The advance of the index bar actuates switch S40 (line 250') energizing 160CR to close contacts (line 370') to operate the valve 206 to supply air to the air chambers 308 to flex the diaphragms 310 thereby to engage the various clutches. The vertical frame then begins its downward stroke slowly with consequent further advance of the follower 326 by the index bar to the extent permitted by the sloping shoulders 336 and 340 of the cam 320 to cause rotation of the various fruit holders 65. When the follower 326 reaches the bottom of the second sloping shoulder 340, the consequent maximum advance of the index bar closes switch S39 (line 246') to operate the valve 206 to vent any of the air chambers 308 that ave not already been vented by the searching operations of the sectionizing tools thereby to disengage any clutches that happen to remain engaged.

The downward movement of the vertical frame 88 closes switch S34 (line 168') to energize 5CR to close contacts (line 340') to turn the water on and to pulse the stroke counter 476. Further downward movement of the vertical frame 88 also closes switch S35 (line 214') to energize 6CR and close contacts (line 346') to actuate by-pass valve 468 to by-pass the restrictor 465 for the purpose of accelerating the downward movement of the sectionizing tools.

At the bottom of the downward movement of the vertical frame, switch S33 closes (lines 164', 210', 216', 230', and 238') to turn off the water to close the bypass valve 468 to make the restrictor 465 effective for retarding the upward movement of the vertical frame, to operate valve 410 to supply compressed air to the lower end of the cylinder 214 to start the upward return movement of the vertical frame 88, to operate valve 412 to vent the upper end of the cylinder 214, and to operate valve 408 to retract the index bar to retract the follower 326 from the cam 320.

The vertical frame 88 then returns upwardly with the follower 326 retracted from the cam 320. Near the top of the upward return stroke of the vertical frame, switch S42 closes (line 244') to advance the index bar to advance the follower 326 against the cam 320 for repetition of the sectionizing operation if the counter 476 has not reached its preset count. The upwardly moving vertical frame 88 closes S36 (line 234') at the top of its stroke to reverse the travel of the vertical frame if the stroke counter has not reached its preset count. If the preset count has been reached, the automatic sectionizing cycle stops and the stroke counter 476 automatically resets to zero. The next cycle of the machine can begin as soon as the operator loads the nine loaders 60 and then presses the start switches S2A and S2B.

The counter 476 may be adjusted, for example, within the range of 12 to 116 counts for different runs of fruit. If 90 percent of the fruit of a run have 12 sections, it would not be economical to employ more than 112 cycles in the sectionizing operation unless the value of the additional production per batch of nine fruit would more than compensate for the reduction in the number of batches processed per hour.

Our description in specific detail of the presently preferred embodiment of the invention will suggest various changes, substitutions, and other departures from our disclosure within the spirit and scope of the appended claims.

We claim:

1. In an apparatus of the character described, wherein a sectionizing tool means comprising two closely spaced tools reciprocates between a retracted position and an advanced position to straddle a radial membrane of a citrus fruit close to the opposite sides of the membrane to separate the membrane from the adjacent pulp sections,
the improvement comprising:
means to extend between the two tools as they are retracted from the fruit to dislodge any portions of the fruit that may be come wedged between the two tools.

2. An improvement as set forth in claim 1 in which said dislodging means comprises a fixed member extending between the two tools.

3. In an apparatus of the character described for sectionizing a citrus fruit having radial sections defined by radial membranes, wherein sectionizing tool means reciprocates to sever successive sections from the fruit and holding means for the fruit rotates step by step in synchronization with the reciprocation of the sectionizing tool means, the sectionizing tool means partially penetrating the fruit during each step of rotation of the holding means until the radial membrane of the rotating fruit contacts the sectionizing tool means whereupon the sectionizing tool means straddles the contacting membrane and makes a sectionizing stroke to free both sides of the membrane from the pulp of the fruit,
the improvement comprising:
said sectionizing tool means having blade means dimensioned to extend radially of the fruit beyond the circumference of the fruit to sever the natural string network that encases the fruit sections,
the sectionizing tool means having a leading edge to serve as a probe to move through the pulp of the fruit towards a radial membrane in response to rotation of the fruit,
said leading edge being of a thickness less than 0.016 inch and greater than 0.006 inch,
said leading edge being curved with a radius of curvature less than 0.008 inch and greater than 0.003 inch.

4. An improvement as set forth in claim 3 in which said radius of curvature is approximately 0.005 inch.

5. An improvement as set forth in claim 3 in which said blade tapers in transverse cross sectional configuration from its trailing edge to its leading edge.

6. An improvement as set forth in claim 3 in which said blade is of the cross sectional configuration of a truncated triangle.

7. In an apparatus of the character described for sectionizing a citrus fruit having radial sections defined by radial membranes, wherein sectionizing tool means reciprocates to sever successive sections from the fruit and holding means for the fruit rotates step by step in synchronization with the reciprocation of the sectionizing tool means, the sectionizing tool means partially penetrating the fruit during each step of rotation of the holding means until a radial membrane of the rotating fruit contacts the sectionizing tool means whereupon the sectionizing tool means straddles the contacted membrane and makes a sectionizing stroke to free both sides of the membrane from the pulp of the fruit,
the improvement comprising:
said sectionizing tool means having a leading edge to move through the pulp of the fruit towards a radial membrane in response to rotation of the fruit, said leading edge having a thickness less than 0.016 inch and greater than 0.006 inch,
said leading edge being of curved cross section with a radius of curvature less than 0.008 inch and greater than 0.003 inch.

8. In an apparatus of the character described for sectionizing a citrus fruit, the pulp of which is divided into sections by radial membranes, means to explore the pulp of the fruit to detect the location of a radial membrane of the fruit in preparation for an operation to separate the radial membrane from adjacent pulp, comprising the combination of:
a probe to penetrate the pulp of the fruit,
said probe having a leading edge of less than 0.016 inch width to make a path through the pulp under a driving force of relatively low magnitude,
said leading edge being blunt to require a driving force of higher magnitude to rupture the radial membrane; and
yielding means operatively connected to the probe and movable to apply a yielding force to the probe of less than said higher magnitude to drive the probe laterally through the pulp into contact with the radial membrane thereby to cause the probe to pause at the radial membrane with consequent yielding action by the yielding means, whereby said yielding action indicates the contact of the probe with the radial membrane.

9. A combination as set forth in claim 8 which includes means responsive to said yielding action to interrupt the movement of the yielding driving means and to initiate said operation for separating the membrane from adjacent pulp.

10. In an apparatus of the character described for sectionizing a citrus fruit, the pulp of which is divided into sections by radial membranes, means to explore the pulp of the fruit to detect the location of a radial membrane in preparation for an operation to separate the membrane from adjacent pulp, said means comprising the combination of:
a probe;
means to support the probe and to move the probe laterally through the pulp of the fruit towards a radial membrane,
said probe having a leading edge sufficiently narrow to force a path through the pulp with relatively low resistance by the pulp,
the leading edge of the probe being blunt to cause the radial membrane to offer relatively higher resistance to rupture by the probe,
said support means being yieldable for yielding action of relatively low magnitude in response to the resistance of the pulp to the movement of the probe through the pulp and for yielding action of greater magnitude in response to encounter of the probe with the radial membrane, whereby the yielding action of the greater magnitude indicates encounter of the probe with the radial membrane.

11. A combination as set forth in claim 10 which includes means responsive to the yielding action of the greater magnitude to stop the travel of the support means and to carry out the membrane-separating operation.

12. A combination as set forth in claim 10 in which the probe is of the general configuration of a blade with the plane of the blade in the direction of prgress of the probe.

13. A combination as set forth in claim 12 in which the blade had the general cross sectional configuration of a truncated triangle.

14. A combination as set forth in claim 10 in which the leading edge of the blade is rounded with a radius of curvature less than 0.008 inch and greater than 0.003 inch.

15. A combination as set forth in claim 14 in which the radius of curvature is approximately 0.005 inch.

16. A combination as set forth in claim 10 in which said support means is a sectionizing tool to carry out the membrane-separating operation by an axial stroke of the sectionizing tool into the fruit.

17 A combination as set forth in claim 16 in which the cross sectional dimension of the probe in its direction of travel is approximately equal to the diameter of the sectionizing tool.

* * * * *